United States Patent
Atwater et al.

(10) Patent No.: US 10,505,188 B2
(45) Date of Patent: Dec. 10, 2019

(54) "B" AND "O" SITE DOPED $AB_2O_4$ SPINEL CATHODE MATERIAL, METHOD OF PREPARING THE SAME, AND RECHARGEABLE LITHIUM AND LI-ION ELECTROCHEMICAL SYSTEMS CONTAINING THE SAME

(71) Applicant: United States Government, as represented by the Secretary of the Army, Aberdeen Proving Ground, MD (US)

(72) Inventors: Terrill B. Atwater, Bel Air, MD (US); Paula C. Latorre, Bel Air, MD (US); Ashley L. Ruth, Bel Air, MD (US)

(73) Assignee: The Government of the United States as represented by the Secretary of the Army, Washington, DC (US)

( * ) Notice: Subject to any disclaimer, the term of this patent is extended or adjusted under 35 U.S.C. 154(b) by 349 days.

(21) Appl. No.: 14/636,183

(22) Filed: Mar. 3, 2015

(65) Prior Publication Data

US 2016/0260968 A1     Sep. 8, 2016

(51) Int. Cl.
| | | |
|---|---|---|
| *H01M 4/505* | (2010.01) | |
| *H01M 4/131* | (2010.01) | |
| *C01G 49/00* | (2006.01) | |
| *C01G 51/00* | (2006.01) | |

(Continued)

(52) U.S. Cl.
CPC ........ *H01M 4/505* (2013.01); *C01G 49/0072* (2013.01); *C01G 51/54* (2013.01); *C01G 53/54* (2013.01); *H01M 4/131* (2013.01); *C01P 2002/32* (2013.01); *C01P 2002/72* (2013.01); *C01P 2004/40* (2013.01); *H01M 4/623* (2013.01); *H01M 4/625* (2013.01)

(58) Field of Classification Search
None
See application file for complete search history.

(56) References Cited

U.S. PATENT DOCUMENTS

| | | |
|---|---|---|
| 5,135,732 A | 8/1992 | Barboux et al. |
| 5,753,202 A | 5/1998 | Wang et al. |

(Continued)

*Primary Examiner* — Daniel S Gatewood
(74) *Attorney, Agent, or Firm* — Azza Jayaprakash

(57) ABSTRACT

A process for preparing a stable Group VIII Period 4 element (iron, cobalt, or nickel) "B" site and chlorine "O" site modified lithium manganese-based $AB_2O_4$ spinel cathode material is provided. The general formula of the "B" and "O" site modified lithium manganese-based $AB_2O_4$ spinel is $LixMn_{2-y}M_yO_{4-z}(Cl_z)$ where M is Fe, Co or Ni. In addition, a Group VIII Period 4 element (iron, cobalt, or nickel) "B" site and chlorine "O" site modified lithium manganese-based $AB_2O_4$ spinel cathode material is provided. Furthermore, a lithium or lithium ion rechargeable electrochemical cell is provided, incorporating the Group VIII Period 4 element (iron, cobalt, or nickel) "B" site and chlorine "O" site modified lithium manganese-based $AB_2O_4$ spinel cathode material in a positive electrode.

4 Claims, 33 Drawing Sheets

(51) Int. Cl.
*C01G 53/00* (2006.01)
*H01M 4/62* (2006.01)

(56) References Cited

U.S. PATENT DOCUMENTS

| | | | | |
|---|---|---|---|---|
| 6,752,979 B1 * | 6/2004 | Talbot | ............... | B82Y 30/00 |
| | | | | 423/263 |
| 2002/0168568 A1 * | 11/2002 | Yamaki | ............... | B60K 6/28 |
| | | | | 429/209 |
| 2003/0235758 A1 * | 12/2003 | Wu | ............... | C01G 45/1242 |
| | | | | 429/224 |
| 2007/0003834 A1 * | 1/2007 | Gao | ............... | C01G 45/1228 |
| | | | | 429/224 |
| 2011/0168938 A1 * | 7/2011 | Esaki | ............... | H01M 4/13 |
| | | | | 252/62.55 |
| 2015/0197872 A1 * | 7/2015 | Ozoemena | ............... | C01G 53/54 |
| | | | | 117/7 |

\* cited by examiner $Li_xMn_{2-y}Fe_yO_{4-z}Cl_z$ XRD $Li_xMn_{2-y}Fe_yO_{4-z}Cl_z$ XRF

"B" AND "O" SITE DOPED $AB_2O_4$ SPINEL CATHODE MATERIAL, METHOD OF PREPARING THE SAME, AND RECHARGEABLE LITHIUM AND LI-ION ELECTROCHEMICAL SYSTEMS CONTAINING THE SAME

GOVERNMENT INTEREST

The invention described herein may be manufactured, used, imported, sold, and licensed by or for the Government of the United States of America without the payment of any royalty thereon or therefore.

FIELD OF THE INVENTION

The present disclosure relates generally to the field of electrochemical power sources and, more particularly, to rechargeable lithium and lithium-ion batteries using manganese-based materials as a positive electrode.

BACKGROUND OF THE INVENTION

Perhaps the most popular battery chemistries that have hit the consumer market recently are lithium-based systems. Lithium batteries use high valence metal oxide materials, which are reduced during the electrochemical reaction. This reaction in rechargeable lithium and rechargeable lithium ion batteries must be fully reversible in order to have a commercially viable cell. These electrochemical systems include manganese-based lithium metal oxides configured in lithium, lithium ion, and lithium polymer electrochemical cells. Common reversible metal oxide materials used in lithium batteries include $Li_xMn_2O_4$, $Li_xMnO_2$, $Li_xCoO_2$, $Li_xNiO_2$, and $Li_xNi_yCo_zO_2$.

Today, rechargeable lithium batteries are used in portable electronic devices including cellular phones and laptop computers. Future use of rechargeable lithium battery systems is targeted at applications related to electronic vehicles and pairing with fuel cells to produce high-energy systems with excellent pulse capabilities. Lithium batteries have the flexibility of being packaged into either cylindrical or prismatic cell designs; this feature makes them applicable to almost any portable electronic system where battery volume is a concern.

The benefits of lithium battery systems include high specific energy (Wh/kg) and high energy density (Wh/l). Lithium electrochemical systems produce a relatively high nominal voltage between 3.0 and 4.75 volts. Lithium electrochemical systems can operate between 3.0 and 4.35 volts or between 2.0 and 3.5 volts. Additionally, lithium electrochemical systems have excellent charge retention due to a low self-discharge rate.

Manganese dioxide ($MnO_2$) based materials are attractive for use as a cathode material in lithium electrochemical systems. $MnO_2$ is attractive because of its high energy density and low material cost. $MnO_2$ is an active material which creates a skeletal structure that allows lithium cations to fill vacancies and voids within the structure. Ideally, this structure does not change with cycling; altering of this crystal structure may cause capacity fading. Additionally, the $MnO_2$ active material exists in different forms. These forms include a lithiated spinel ($Li_xMn_2O_4$) and its different structures denoted by $\alpha$, $\beta$, $\gamma$, and $\lambda$. In lithium electrochemical cells, the active material is bound to an aluminum current collector with either Teflon or pVdF mixed with conductive carbon. The conductive carbon serves as an aid for electron transfer.

Capacity fading is a major problem for rechargeable lithium cells. Capacity fading is the loss of cycle capacity in a cell over the life of an electrochemical system, limiting the practical number of cycles that may be used. In lithium battery systems, capacity fading is often attributed to the degradation of the active cathode material. This cyclic capacity loss is a result of both changes in composition and crystal structure of the active cathode material. Additionally, throughout the life of a cell, parasitic side reactions occur between chemical species of all cell components. Methods of reducing this effect include modifying the crystal structure and/or composition of the active material.

Capacity fading associated with the cathode material has also been linked to the fracture of active material and the dissociation or disconnection of the fractured active material from the electrode. Fractures are caused by mechanical stress-strain of $MnO_2$ crystal structures during cycling of the cell. Stress-strain forces act on the crystal structures as a result of repeated phase transitions. These stress-strain forces are due to the insertion and extraction of lithium in the cathode lattice. This frequent conversion in geometry and dimension of the crystal lattice creates a significant mechanical strain on the cathode. This mechanical strain is believed to electrically disconnect active material from the electrode through fracture. Additionally an external influence, such as elevated temperature, can also promote cathode fracture. In this case structural vibrations increase with temperature, resulting in the disconnection of the fractured active material from the electrode.

Another major cause of capacity fading in manganese-based cathodes is the dissolution of manganese into the electrolyte. Through a series of chemical reactions, manganese ($Mn^{2+}$) is removed from the cathode and dissolved into the electrolyte, resulting in a decrease of active material in the cathode. Manganese dissolution is linked to reactions with the electrolyte and, more importantly, the impurities dissolved within the electrolyte. Many of these reactions are linked to the water content of the electrolyte and the presence of hydrofluoric acid (HF). The products of parasitic reactions are phase transitions of the $MnO_2$ structure, which results in the formation of $Mn_2O_3$ and $Mn_3O_4$.

Manganese dioxide ($MnO_2$) provides a skeletal background for lithium intercalation during cycling of a lithium electrochemical cell. When fully charged, manganese particles have a meta-stable 4+ valence state. This meta-stable 4+ valence state allows for the attraction and intercalation of lithium cations into the lattice structure. As lithium cations fill the skeleton crystal structure during discharge, the crystal structure of the active material changes. Charging of the cell removes these lithium cations from the cathode, again altering the crystal structure. Ideally, this is a completely efficient and reversible process, but realistically, continuous crystal structure changes lead to phase transitions that can impede lithium mobility. As a result of these phase changes, unwanted crystal structures develop that are either too stable for electrochemical reactions or block the insertion/extraction paths of lithium cations into the cathode material. This general phenomenon is regarded as the major contributor to capacity fading.

$MnO_2$ exists in several phases or crystal structures and are referred to by the following prefixes: $\alpha$, $\beta$, $\gamma$, and $\lambda$. $\alpha$-$MnO_2$ is the most stable $MnO_2$ structure. $\alpha$-$MnO_2$ is one-dimensional and the lattice contains both one by one and two by two channels for lithium insertion/extraction. $\beta$-$MnO_2$ is a tetragonal structure with the lattice containing one by one channels for lithium insertion/extraction. γ-$MnO_2$ is also one-dimensional, existing in both hexagonal and orthorhombic crystal structures with a lattice that contains one by two channels for lithium insertion/extraction. Because of their stability α-$MnO_2$, β-$MnO_2$, and γ-$MnO_2$ are not considered rechargeable. However, cycling of lithium into the α-$MnO_2$, β-$MnO_2$, and γ-$MnO_2$ lattice can be achieved with rigid stoichiometric control.

λ-$MnO_2$ is considered the preferred $MnO_2$ based cathode material for rechargeable lithium electrochemical systems. λ-$MnO_2$ is created through the delithiation of $Li_xMn_2O_4AB_2O_4$ spinel. The λ-$MnO_2$ crystal structure is maintained through both charge and discharge of the $LiMn_2O_4$ spinel. The maintenance of the λ-$MnO_2$ structure during insertion and extraction of lithium in the $Li_xMn_2O_4$ spinel makes it an attractive couple with lithium for rechargeable electrochemical systems. The λ-$MnO_2$ crystal structure is a three dimensional cubic array. This crystal structure promotes mechanical stability and adequate pathways for lithium insertion/extraction. Degradation of the λ-$MnO_2$ crystal structure forming α, β, or γ-$MnO_2$ crystals and other $Mn_xO_y$ phases reduces the capacity of the cathode material.

As lithium intercalates, the size and orientation of the crystal structures change. In $Li_xMn_2O_4$ spinel materials, when $0.05<x<1$, the crystal structure is cubic (λ-$MnO_2$). When $1<x<1.8$, the structure of $Li_xMn_2O_4$ (no longer a $AB_2O_4$ spinel) is tetragonal. Additionally, when $x<0.05$, a phase transition to the more stable α, β, and γ $MnO_2$ can occur. Continued charge and discharge promotes the transformation of the cubic crystal structure to other cubic, tetragonal, and monoclinic phases. Tetragonal and monoclinic crystal structures may become inactive leading to the loss of active cathode material.

Voltage control, maintaining $0.05<x<1$, allows for the mitigation of the formation of unwanted crystal structures. When the potential of the lithium/$Li_xMn_2O_4$ electrochemical system is maintained between 3.0 and 4.25 volts, the cubic phase is maintained. Once the potential of the system drops below 3.0 volts the $Li_xMn_2O_4$ cathode material undergoes a phase change from cubic to tetragonal. When the potential of the system increases above 4.25 volts, the $Li_xMn_2O_4$ cathode material becomes stripped of the lithium component and undergoes a phase change from cubic (λ-$MnO_2$) to the more stable α, β and/or γ $MnO_2$.

Other phase transitions that lead to capacity fading include the formation of $Mn_2O_3$ and $Mn_3O_4$. The $Mn_2O_3$ and $Mn_3O_4$ formations result from the liberation of oxygen in the $MnO_2$ and $Mn_2O_4$ structures. The valence state of manganese in these structures is 3+ or less. This lower valence state creates a stable crystal structure that is not conducive to lithium intercalation and, therefore, not rechargeable. As more $Mn_2O_3$ and $Mn_3O_4$ are formed, less $MnO_2$ and $Mn_2O_4$ remain and the usefulness of the cathode decreases.

Thus, one of the disadvantages of conventional lithium manganese-based $AB_2O_4$ spinel materials is the limited cycle life and limited rate capability for lithium electrochemical systems. Furthermore, this problem is a major obstacle for rechargeable lithium battery technology. An additional limiting factor for lithium manganese-based $AB_2O_4$ spinel materials is the time required to process the raw materials and synthesize the desired product; conventional methods require multiple mixing, grinding and calcining steps, which takes days to complete.

SUMMARY OF THE INVENTION

The present disclosure resolves the aforementioned problems associated with conventional lithium manganese-based $AB_2O_4$ spinel cathode materials in lithium electrochemical systems and rechargeable lithium electrochemical systems. The present disclosure provides a Group VIII Period 4 element (iron, cobalt, or nickel) "B" site and chlorine "O" site modified lithium manganese-based $AB_2O_4$ spinel cathode material with improved performance over conventional $LiMn_2O_4$ lithium battery cathode material. The present Group VIII Period 4 element (iron, cobalt, or nickel) "B" site and chlorine "O" site modified lithium manganese-based $AB_2O_4$ spinel cathode material exhibits overvoltage and under-voltage tolerance and avoids problems associated with loss of reversibility in lithium batteries without suffering from the disadvantages, limitations, and shortcomings associated with rigid stoichiometry electronic control.

More specifically, the present $Li/Li_xMn_{2-y}M_yO_{4-z}Cl_z$, where M is Fe, Co or Ni, electrochemical cells exhibit increased discharge capacity and resilient enhanced overcharge behavior that allows the cathode to be fully reversible at elevated charge potentials and decreased discharge potentials. The present electrochemical cell system maintains its recyclability after charge potentials greater than 5.2 volts and discharge potentials less than 2.0 volts. Thus, the present $Li/Li_xMn_{2-y}M_yO_{4-z}Cl_z$ electrochemical cells produce the required reversibility and meet other significant lithium battery operational objectives (e.g., low impedance and thermal stability).

In addition, the cycle life of the lithium cells fabricated using the present spinel material is significantly longer than cells fabricated using conventional lithium manganese-based $AB_2O_4$ spinel materials. The Group VIII Period 4 element and chlorine-modified $Li_xMn_{2-y}M_yO_{4-z}Cl_z$ cathode material allows for over-discharge protection. Reversibility in the material is maintained after cell potential excursions less than 2.0 volts are performed. When the Group VIII Period 4 element and chlorine-modified $Li_xMn_{2-y}M_yO_{4-z}Cl_z$ cathode material is coupled with a lithium anode, it successfully cycles between 5.2 and 2.0 volts without significant degradation. Conventional $Li_xMn_2O_4$ cathode materials tend to degrade as a result of stress/strain-induced material fracture and formation of $Mn_2O_3$ and $Mn_3O_4$. This is due to the cubic to tetragonal and cubic to monoclinic phase changes as a result of the $Mn^{3+}$ valence state. Both of these conditions occur as the electrochemical cell potential transitions through 3.0 volts.

Furthermore, the present disclosure provides a method of preparing the aforementioned Group VIII Period 4 element (iron, cobalt, or nickel) "B" site and chlorine "O" site modified lithium manganese-based $AB_2O_4$ spinel cathode material via a method comprising of an initial nitrate flame synthesis process followed by a calcining reaction. This method employs a chelating agent, manganese nitrate, Group VIII Period 4 element nitrate, lithium nitrate, chlorinated lithium compound, chlorinated Group VIII Period 4 compound and chlorinated manganese compound yielding the present $Li_xMn_{2-y}M_yO_{4-z}Cl_z$, where M is Fe, Co or Ni, compound. By introducing a Group VIII Period 4 element and chlorine with the initial starting materials, Group VIII Period 4 element and chlorine is present in the nitrate flame synthesis reaction intermediate resultant ash material mixture. Synthesis of a uniform Group VIII Period 4 element modified, chlorinated lithium manganese-based $AB_2O_4$ spinel material is achieved via calcining of the resultant ash. In contrast to conventional preparation methods, the addition of chlorine in the formulation and fabrication process is evenly distributed throughout the bulk of the material. While conventional preparation methods tend to produce materials with concentration gradients radiating from the particle edge to the particle core, the preparation method according to the present disclosure provides for an even distribution within the body of the particle. In addition, the preparation method according to the present disclosure provides for a submicron particle size of uniform size. Furthermore, the cycle life of the lithium cells fabricated using the present spinel material is significantly longer than cells fabricated using conventional lithium manganese-based $AB_2O_4$ spinel materials.

The present disclosure provides a method of preparing the aforementioned Group VIII Period 4 element (iron, cobalt, or nickel) "B" site and chlorine "O" site modified lithium manganese-based $AB_2O_4$ spinel cathode material via a method comprising of an initial nitrate flame process followed by a calcining reaction yielding the present $Li_xMn_{2-y}M_yO_{4-z}Cl_z$, where M is Fe, Co or Ni, compound. By introducing chlorine into the starting material mixture, the synthesis process time of lithium manganese-based $AB_2O_4$ spinel materials is dramatically reduced. In contrast to conventional preparation methods, the addition of chlorine in the formulation and fabrication process reduces the processing time by at least an order of magnitude. While conventional preparation methods take 48 to 72 hours, the preparation method according to the present disclosure may take less than 8 hours. In addition, the preparation method according to the present disclosure is performed at relatively low temperatures, affording better process control.

The preparation method according to the present disclosure may take less than 8 hours of which 2 hours is at a relatively low temperature calcining step, while conventional preparation methods take at least 48 hours at elevated temperature. In addition, the relatively low temperatures of the preparation method according to the present disclosure, affords better process control. The reduced time and temperature during the calcining step of the present disclosure affords a uniform introduction of the Group VIII Period 4 element (iron, cobalt, or nickel) "B" site modifier. At extended calcining times and at elevated temperatures all of for minor components to undergo defect association which then leads to phase separation. Defect association minimizes the effect of an additive by concentrating the additive thus reducing the beneficial impact through decreased site density.

According to an exemplary embodiment of the present disclosure, a stable lithium manganese-based $AB_2O_4$ spinel material is synthesized using a nitrate flame process and calcining and produces a $Li_xMn_{2-y}M_yO_{4-z}Cl_z$, where M is Fe, Co or Ni, cathode material that may be employed as a positive electrode for lithium and lithium ion rechargeable electrochemical cells and batteries. The general formula for the material is $Li_xMn_{2-y}M_yO_{4-z}Cl_z$, where x≈1 and y ranges from 0.005 to 0.6 and z ranges from 0.005 to 0.25 and the reversible region for x for the $Li/Li_xMn_{2-y}M_yO_{4-z}Cl_z$ electrochemical couple ranges from 0.05 to 1.9. In one embodiment, a method of preparing a homogeneously dispersed Group VIII Period 4 element and chlorine-modified lithium manganese based $AB_2O_4$ spinel cathode material includes dissolving a chlorine-containing salt, a nitrate of a Group VIII Period 4 element, manganese nitrate, and lithium nitrate to form an aqueous solution. Then, the aqueous solution is mixed with a chelating agent to produce a mixture. The mixture is then heated to produce an ash, and the ash is ground. Then, the ground ash is calcined for a time period no greater than 5 hours at a temperature of at least 350° C. to produce the homogeneously dispersed Group VIII Period 4 element and chlorine-modified lithium manganese-based $AB_2O_4$ spinel cathode material.

Another embodiment of the present disclosure is a "B" and "O" site modified lithium manganese-based $AB_2O_4$ spinel cathode material prepared using the aforementioned method. In yet another embodiment of the present disclosure, a lithium electrochemical cell includes an anode and a cathode including the present "B" and "O" site modified lithium manganese-based $AB_2O_4$ spinel cathode material.

BRIEF DESCRIPTION OF THE DRAWINGS

The accompanying drawings, which are included to provide further understanding of the present disclosure, and are incorporated in and constitute a part of the specification, illustrate preferred embodiments of the present disclosure, and together with the description serve to explain the principles of the present disclosure. The present disclosure will now be described further with reference to the accompanying drawings as follows.

DETAILED DESCRIPTION

Figure 1:
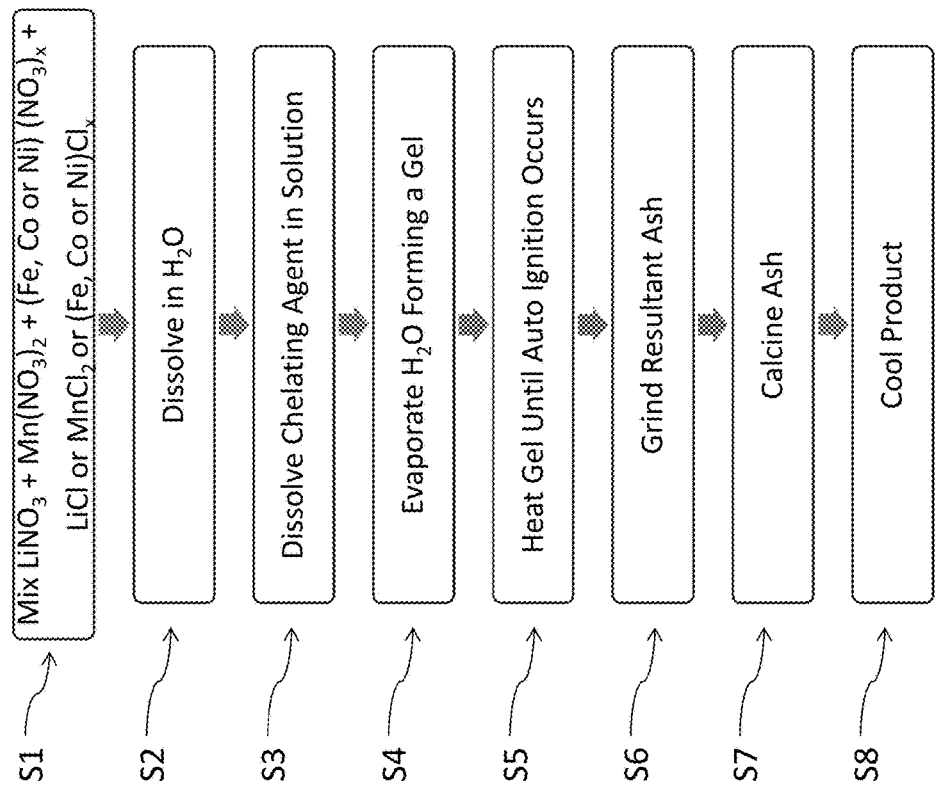
FIG. 1 is a flowchart illustrating process steps in an exemplary embodiment of the present disclosure.

FIG. 1 is a flowchart illustrating process steps in an exemplary embodiment of the present disclosure. More specifically, FIG. 1 shows exemplary steps according to the present disclosure for the preparation of $Li_xMn_{2-y}M_yO_{4-z}Cl_z$, Where M is Fe, Co or Ni, Spinel material via a method comprising of an initial nitrate flame process followed by a calcining reaction. In step S1, a chlorine-containing salt is added to lithium nitrate, manganese nitrate and a Group VIII Period 4 element (iron, cobalt, or nickel) nitrate. Suitable chlorine-containing salts include, but are not limited to, lithium chloride, manganese chloride, iron chloride, cobalt chloride, and nickel chloride.

In Step S2, the mixture is then dissolved in distilled or de-ionized water. In Step S3, glycine is then dissolved into the aqueous solution as a chelating agent. Suitable chelating agents include, but are not limited to, glycine, cellulose, citric acid, a cellulose-citric acid mixture, and urea. In Step S4, the solution is heated on a hot plate until the water fully evaporates and a gel is formed. In Step S5, the gel is heated further until auto ignition occurs and forms an ash. The ash is collected and ground in Step S6.

In Step S7, the ash is calcined in a furnace at 600° C. for 2 hours. Alternatively, suitable calcination temperatures and times range from 350° C. to 800° C. (for 1 to 4 hours), from 400° C. to 600° C. (for 1.5 to 3 hours), or from 500° C. to 600° C. (for 2 to 2.5 hours). In Step S8, the mixture is cooled at a temperature ranging from 20° C. to 300° C. (for 1 to 24 hours), from 20° C. to 150° C. (for 1 to 4 hours), or from 20° C. to 50° C. (for 1 to 2.5 hours). The stoichiometric ratio in the final $Li_xMn_{2-y}M_yO_{4-z}Cl_z$ where M is Fe, Co or Ni, material ranges from x=0.05 to 1.9, y=0.005 to 0.6, and z=0.005 to 0.25. The stoichiometric ratio in the final $Li_xMn_{2-y}M_yO_{4-z}Cl_z$ material preferred embodiment ranges from x=0.8 to 1.3, y=0.005 to 0.3, and z=0.005 to 0.05

The exemplary process described above results in the formulation of a family of Group VIII Period 4 element (iron, cobalt, or nickel) "B" site and chlorine "O" site modified lithium manganese-based $AB_2O_4$ spinel cathode material. The general formula for the lithium electrochemical cell cathode prepared is $Li_xMn_{2-y}M_yO_{4-z}Cl_z$, where M is iron, cobalt or nickel, x≈1 and proves to be reversible between 5.2 and 2.0 volts. This reversible region for x in a lithium electrochemical cell comprised of the present disclosure ranges from 0.05 to 1.9 and y ranges from 0.005 to 0.6 and z ranges from 0.005 to 0.25.

Figure 2:
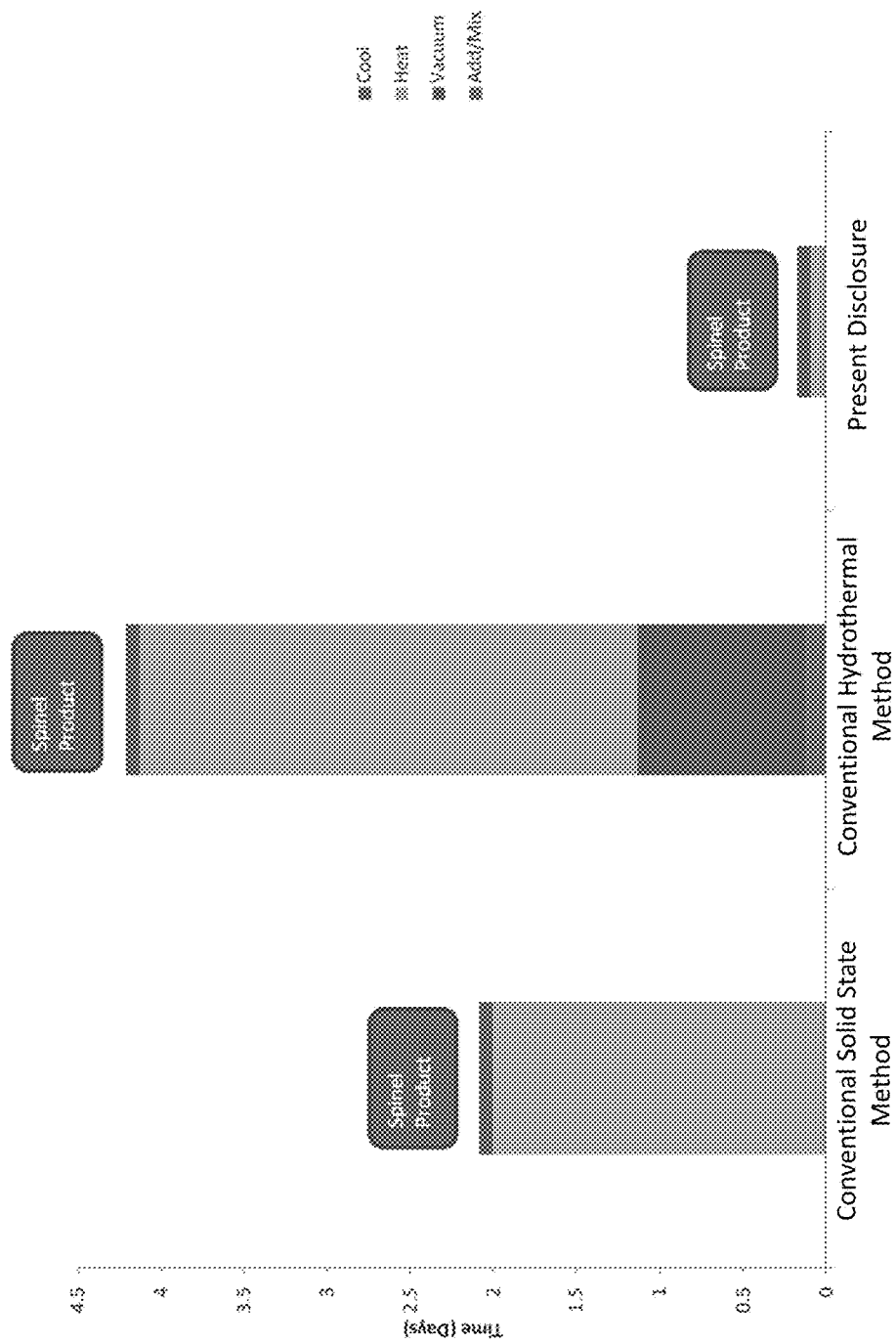
FIG. 2 is a timeline chart contrasting the required fabrication times for an exemplary embodiment of the present disclosure versus conventional preparation methods.
Figure 3:
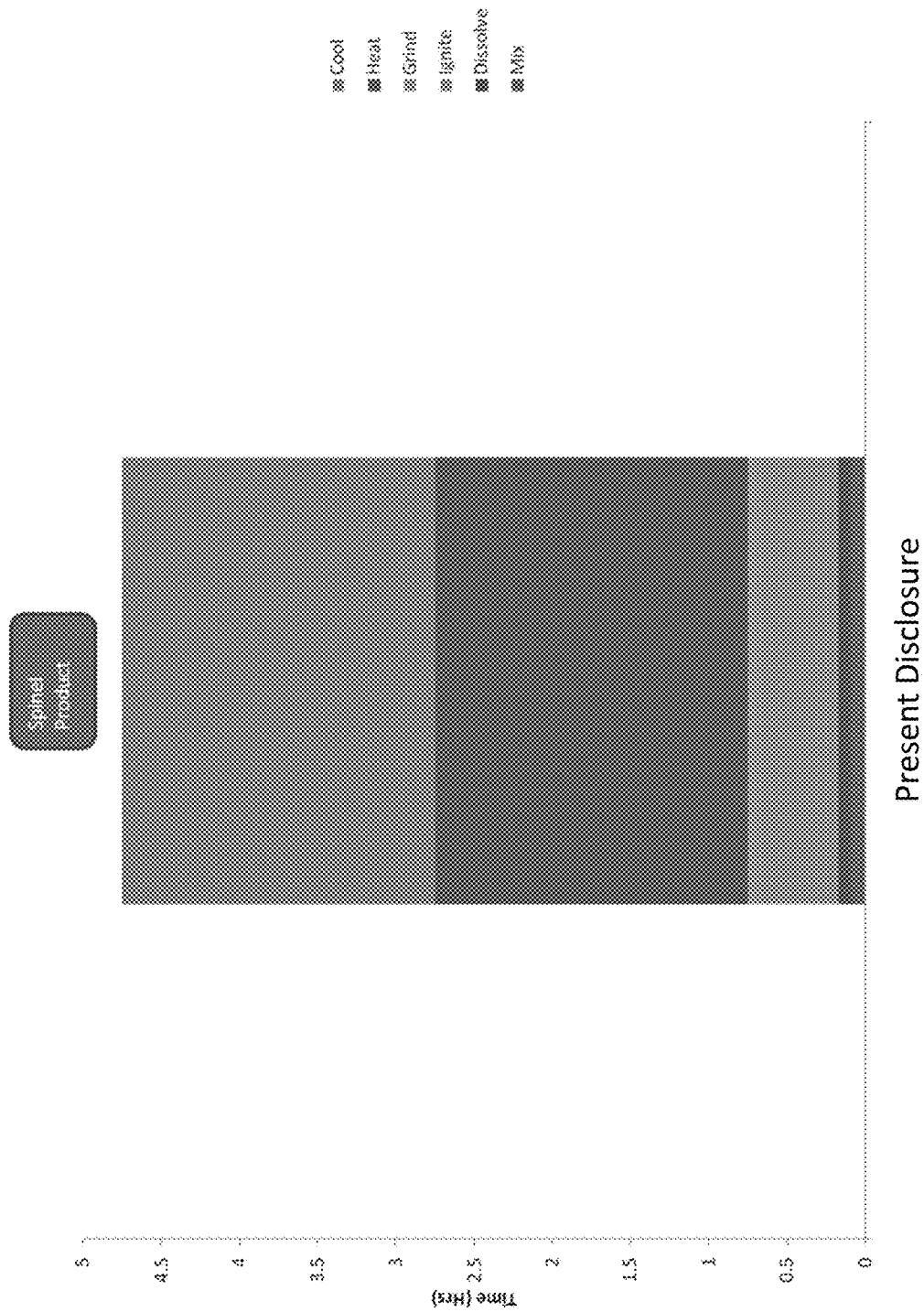
FIG. 3 is an expanded spinel formation timeline chart showing an exemplary embodiment of the present disclosure.

FIGS. 2 and 3 illustrate steps and timelines for conventional fabrication methods versus the preparation methods provided in the present disclosure. These conventional solid state and hydrothermal fabrication methods are described in U.S. Pat. Nos. 5,753,202 and 5,135,732, respectively (which are incorporated by reference in their entirety). FIG. 3 shows an expanded view of the steps of an exemplary method according to the present disclosure. As shown in FIGS. 2 and 3, the entire fabrication process (including cooling time) takes over 2 or 4 days using conventional solid state and hydrothermal methods, respectively. In contrast, the entire fabrication process (including cooling time) takes approximately 4.5 hours using the present fabrication method.

Figure 4:
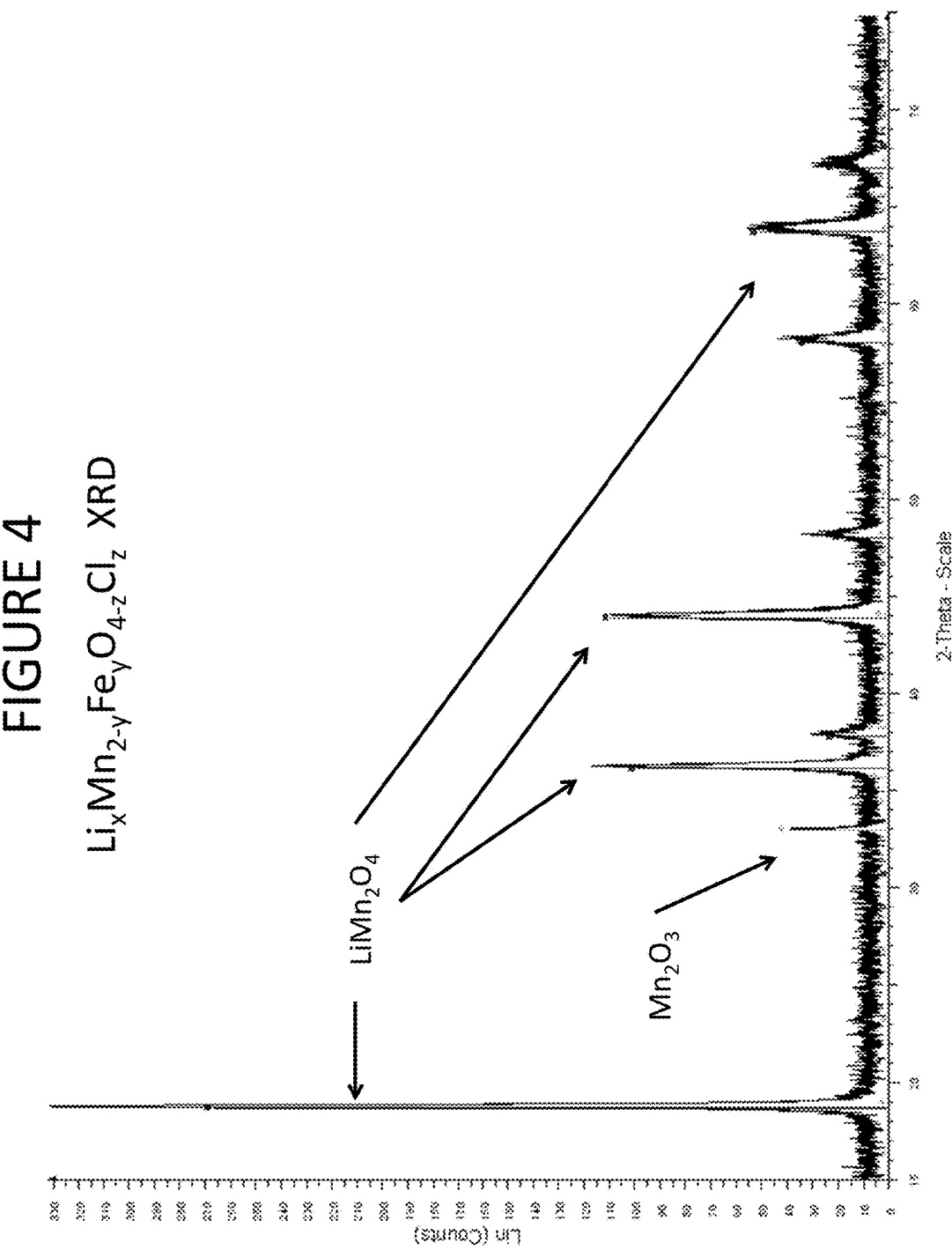
FIG. 4 is a graph showing x-ray diffraction data for an exemplary formulation mixture according to exemplary embodiments of the present disclosure.
Figure 5:
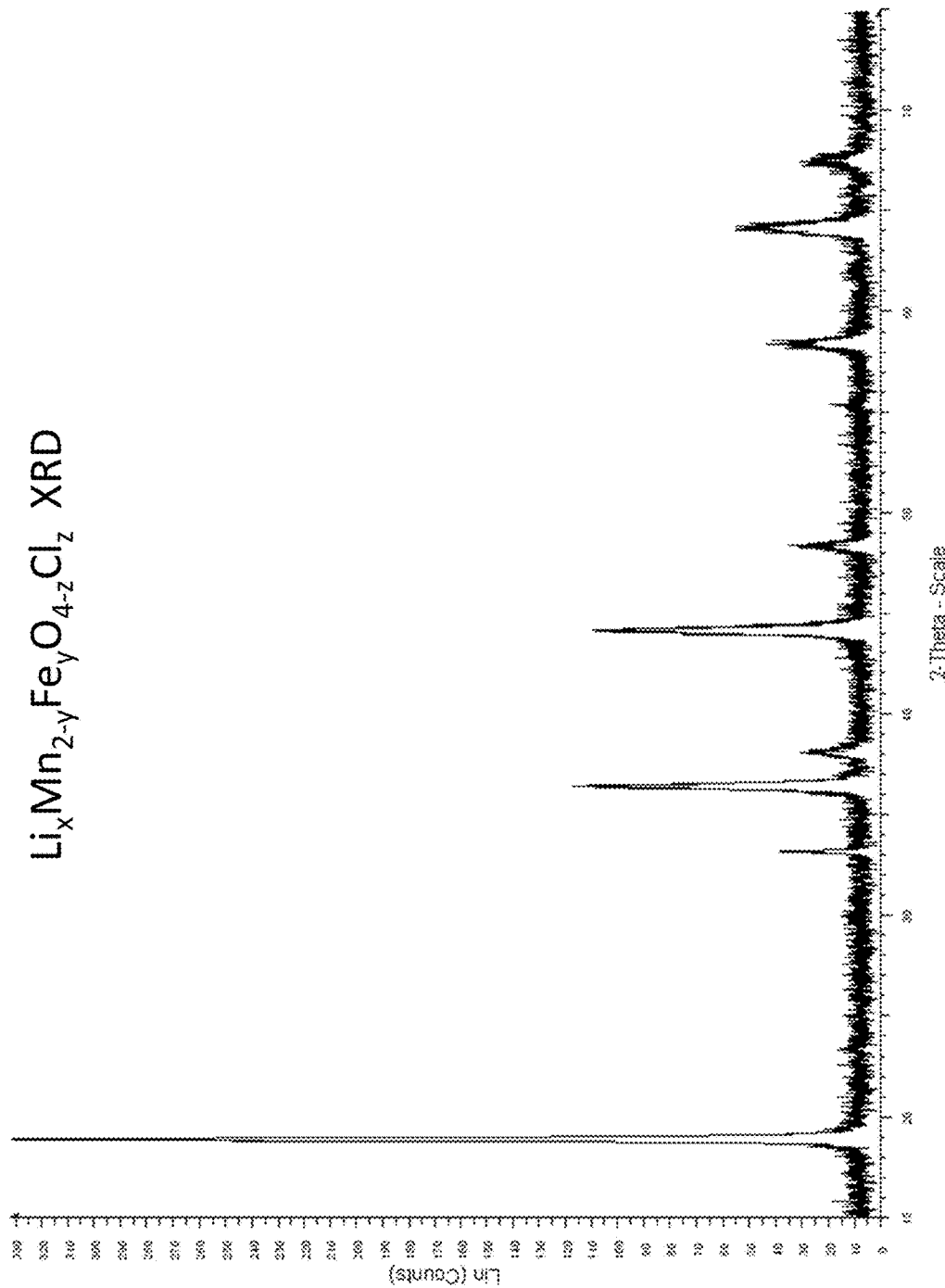
FIG. 5 is a graph showing x-ray diffraction data for an exemplary formulation mixture according to exemplary embodiments of the present disclosure compared to known reference standards.
Figure 6:
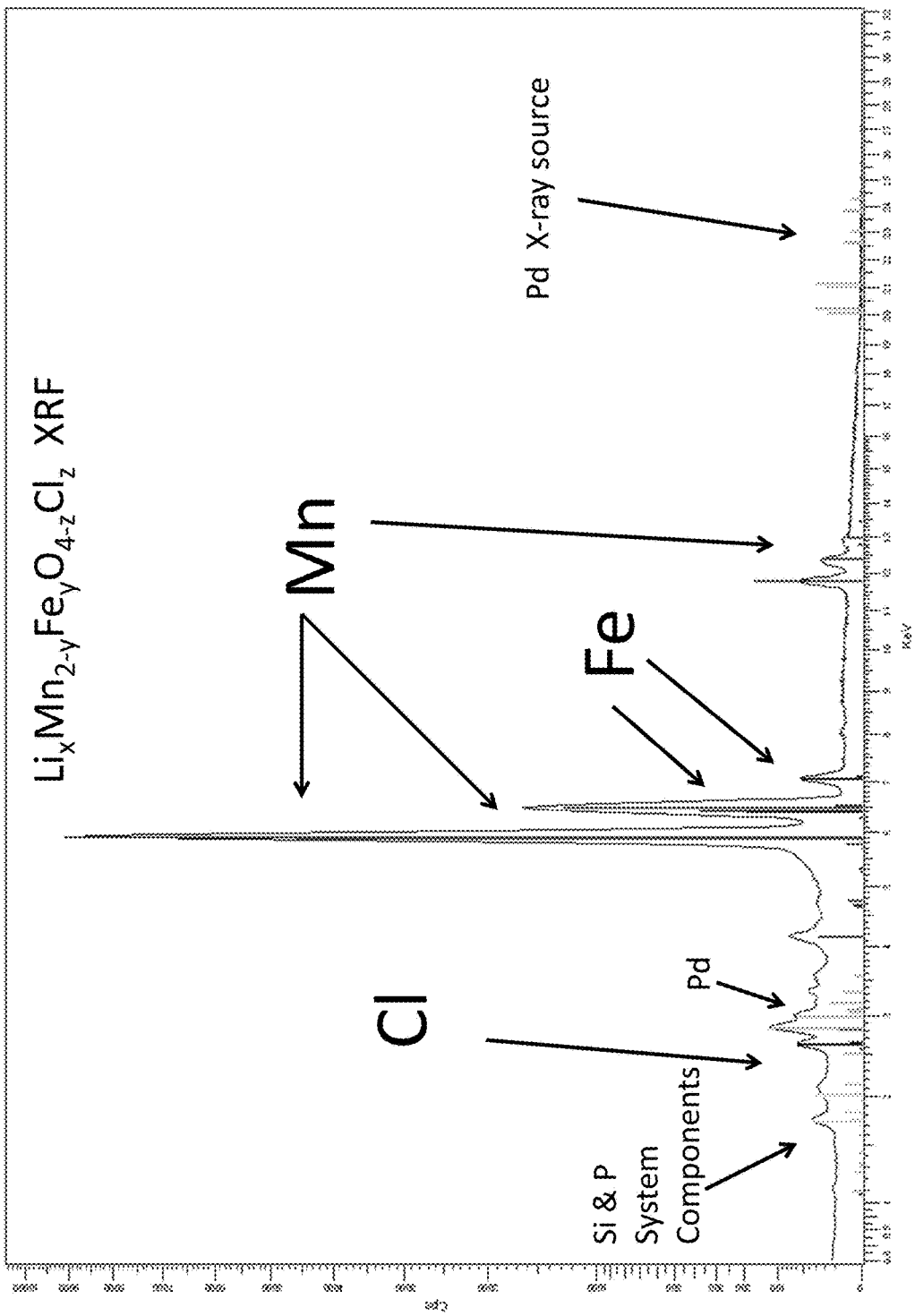
FIG. 6 is a graph showing x-ray fluorescence data for an exemplary formulation mixture according to exemplary embodiments of the present disclosure.
Figure 7:
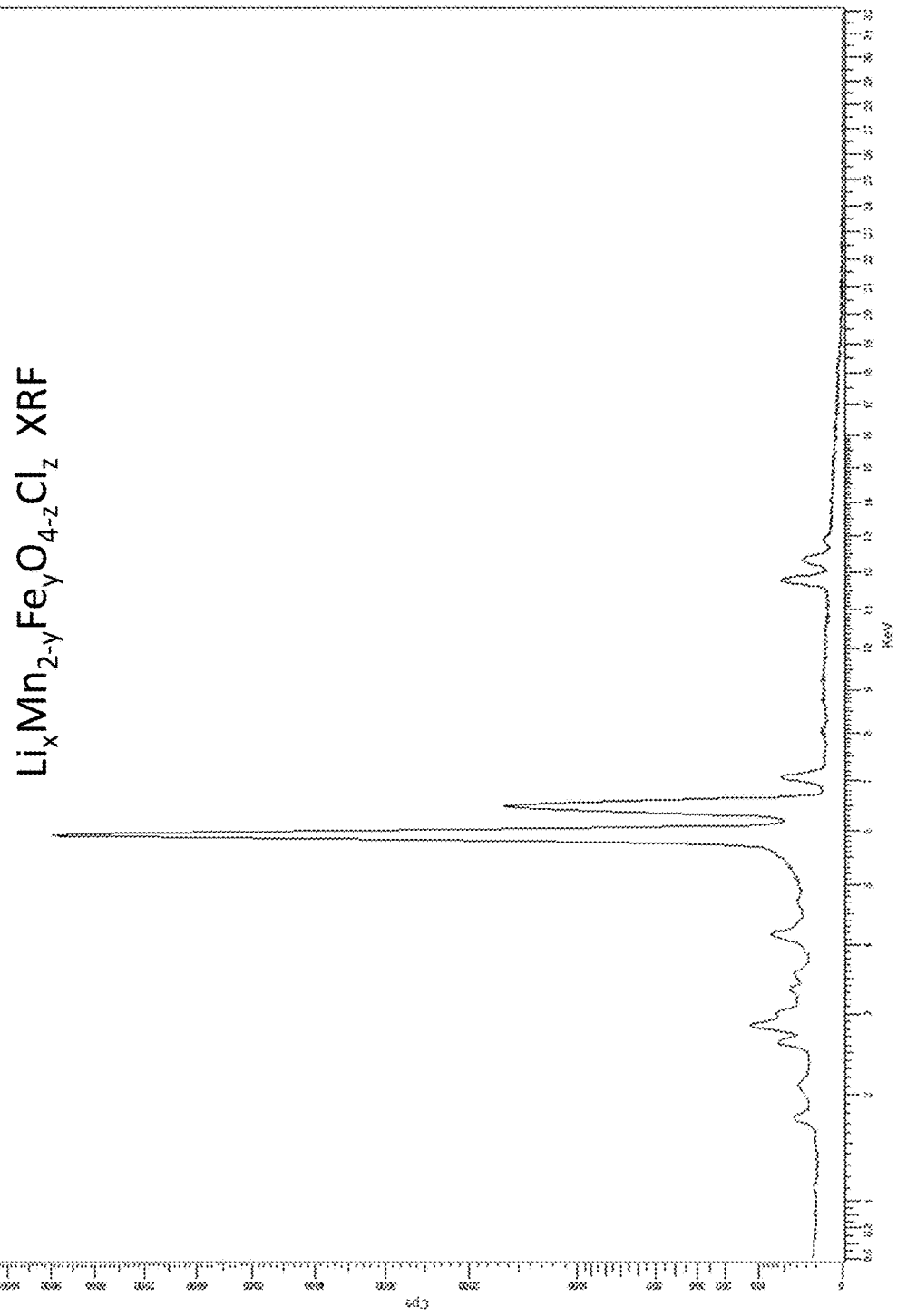
FIG. 7 is a graph showing x-ray fluorescence data for an exemplary formulation mixture according to exemplary embodiments of the present disclosure compared to known references.

FIGS. 4 and 5 shows the X-ray diffraction pattern of an exemplary formulation mixture according to exemplary embodiments of the present disclosure compared to known reference standards. The figure shows the final $Li_xMn_{2-y}Fe_yO_{4-z}Cl_z$ material according to the present disclosure. Included in FIG. 5 is the standard data for intensity and location from the International Center for Diffraction Data for $Mn_2O_3$ and $LiMn_2O_4$ spinel. FIGS. 6 and 7 shows the X-ray Fluorescence Pattern for an exemplary formulation mixture of the present disclosure. Included in FIG. 7 is the data of the final $Li_xMn_{2-y}Fe_yO_{4-z}Cl_z$ material as well as intensity and energy level for the system components. These components include the palladium X-ray source and silicon and phosphorus from the sample holder.

In order to evaluate the electrochemical properties of the present Group VIII Period 4 element (iron, cobalt, or nickel) "B" site and chlorine "O" site modified lithium manganese-based $AB_2O_4$ spinel cathode material in an electrochemical system, laboratory coin cells were fabricated using conventional methods described in detail below. Experimental cells may also be fabricated using other methods known in the art, incorporating the $Li_xMn_{2-y}M_yO_{4-z}Cl_z$, where M is Fe, Co or Ni, lithium manganese-based $AB_2O_4$ spinel material described in the present disclosure. The experimental cells were composed of a lithium anode separated from a Teflon bonded cathode with a nonwoven glass separator. Other suitable anode materials include, but are not limited to, lithium metal, lithium aluminum alloy, lithium silicon alloy, graphite and graphite derivatives, tin oxide, and lithium phosphate. The cathode was fabricated by combining $Li_xMn_{2-y}M_yO_{4-z}Cl_z$, carbon, and Teflon in a 75:15:10 weight percent basis, respectively. Suitable conductive carbon materials include, but are not limited to, conductive carbon black (commercially available from various sources, including Cabot Corporation, under the trade name VUL- CAN XC72 or VULCAN XC72R), graphite, carbon nanofibers, and carbon nanoparticles (commercially available under the trade name PURE BLACK, manufactured by Superior Graphite Co.). Suitable binders include, but are not limited to, polytetrafluoroethylene (commercially available under the trade name TEFLON, manufactured by DuPont), polyvinylidene fluoride (PVDF), and latex. The cathode may contain by weight 40%-95% of $Li_xMn_{2-y}M_yO_{4-z}Cl_z$, 1%-40% of conductive carbon, and 1%-20% binder.

The cathode mix was rolled to 0.06 cm and dried in a vacuum oven. The cathode mass was approximately 0.1 g. The cathode and 0.075 cm thick lithium foil was cut using a 1.58 cm diameter (1.96 cm$^2$) hole punch. A 0.01 cm nonwoven glass separator was used for the separator and as a wick. The electrolyte used was 1 M $LiPF_6$ in proportional mixtures of dimethyl carbonate and ethylene carbonate. Other suitable electrolytes include, but are not limited to, lithium hexafluoroarsenate monohydrate ($LiAsF_6$), lithium perchlorate ($LiClO_4$), lithium tetrafluoroborate ($LiBF_4$), and lithium triflate ($LiCF_3SO_3$). The cells were cycled with an ARBIN Model MSTAT4 Battery Test System. The charge profile consisted of a constant current charge at 1.0 or 2.0 mA to 4.5, 4.75, 5.0 or 5.2 volts. The cells were discharged at 1.0 or 2.0 mA to 2.0, 2.25 or 3.5 volts. A rest period of 15 minutes between cycles allowed for the cells to equilibrate. Prior to cycling, cell impedance was recorded with a Solartron, SI1260 Frequency Response Analyzer with a Solartron, SI1287 Electrochemical Interface using Scribner Associates, Inc., ZPlot and ZView software. The data is used as a quality control tool and for comparative use between variant chemistries.

The data shows stable Group VIII Period 4 element (iron, cobalt, or nickel) "B" site and chlorine "O" site modified lithium manganese-based $AB_2O_4$ spinel cathode material was formulated, fabricated, and characterized as a positive electrode suitable for lithium and lithium ion rechargeable electrochemical cells and batteries. The general formula for the present spinel material is $Li_xMn_{2-y}M_yO_{4-z}Cl_z$, where M is Fe, Co or Ni, and x ranges from 0.05 to 1.9 and y ranges from 0.005 to 0.60 and z ranges from 0.005 to 0.25 and the reversible region for x for the $Li/Li_xMn_{2-y}M_yO_{4-z}Cl_z$ electrochemical couple ranges from 0.05 to 1.9. The specific capacity for the Group VIII Period 4 element and chlorine-modified lithium manganese-based $AB_2O_4$ spinel cathode material ranged from 100 to 125 mAh/g when coupled with lithium and cycled between 5.2 and 3.5 volts. This is comparable to conventional lithium manganese-based $AB_2O_4$ spinel materials fabricated over a 48 to 72-hour time span. Processing time according to the present disclosure has been dramatically reduced to less than 8 hours. The specific capacity for the Group VIII Period 4 element and chlorine-modified lithium manganese-based $AB_2O_4$ spinel cathode material was 195 to 205 mAh/g when coupled with lithium and cycled between 5.2 and 2.0 volts. $Li/Li_xMn_{2-y}M_yO_{4-z}Cl_z$ cells cycled between 4.5 and 3.5 maintained greater than 95% of their original capacity thru 200 cycles.

FIGS. 8-14 show galvanostatic (charge/discharge) and differential capacity plots for lithium electrochemical cells fabricated with "B" and "O" site modified lithium manganese-based $AB_2O_4$ spinel cathode material, synthesized using the method described in the present disclosure. In the exemplary plots shown in FIGS. 8-14 iron is the Group VIII Period 4 "B" site element in the modified lithium manganese-based $AB_2O_4$ spinel cathode material. The chlorine to manganese ratios in the final product is 0.0043 while the iron to manganese ratio is 0.0716.

Figure 8:
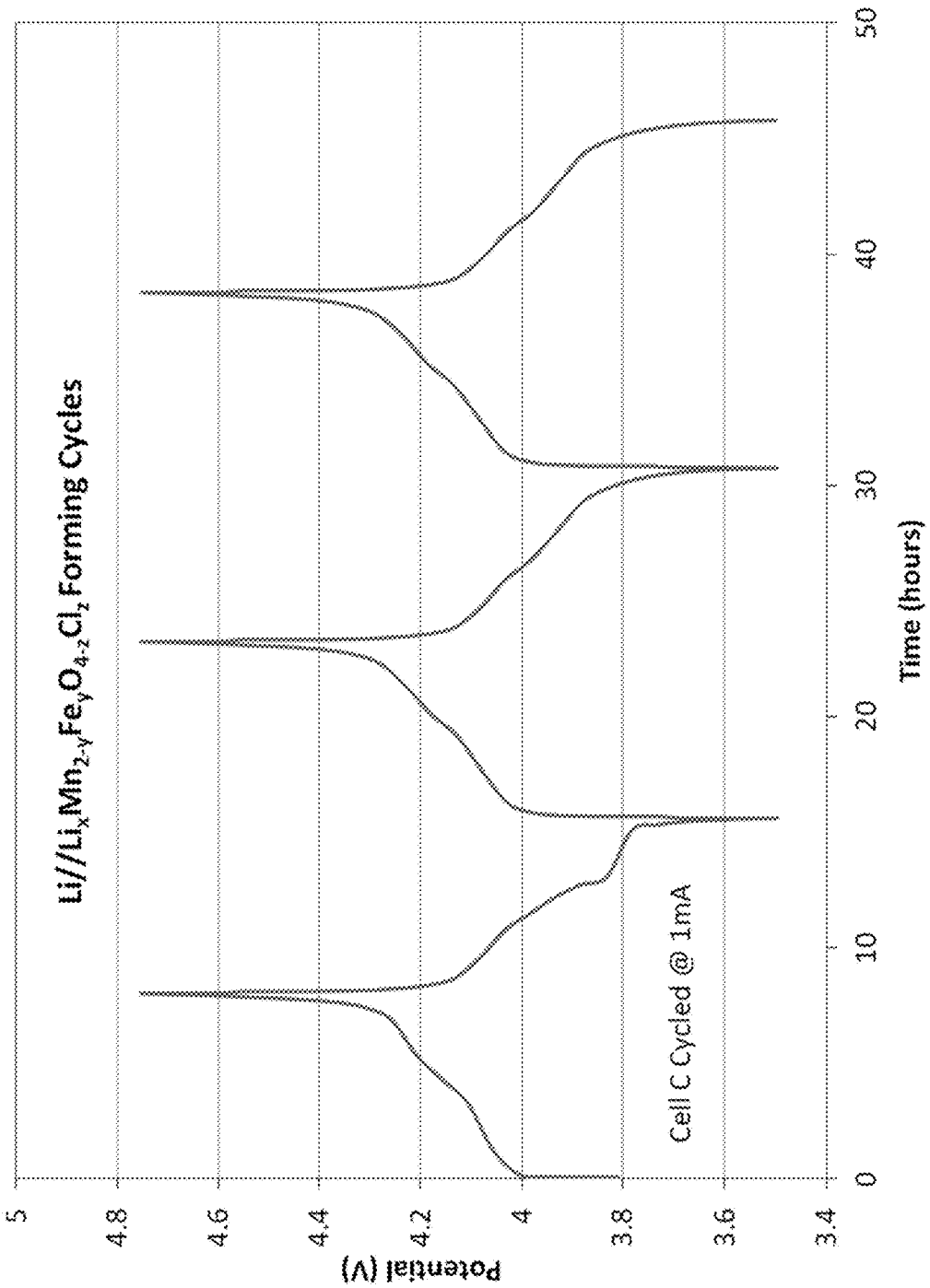
FIG. 8 is a graph illustrating representative forming cycles (charge/discharge) curves for a lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure. For this graph, the M in $Li_xMn_{2-y}M_yO_{4-z}Cl_z$ is Fe.
Figure 9:
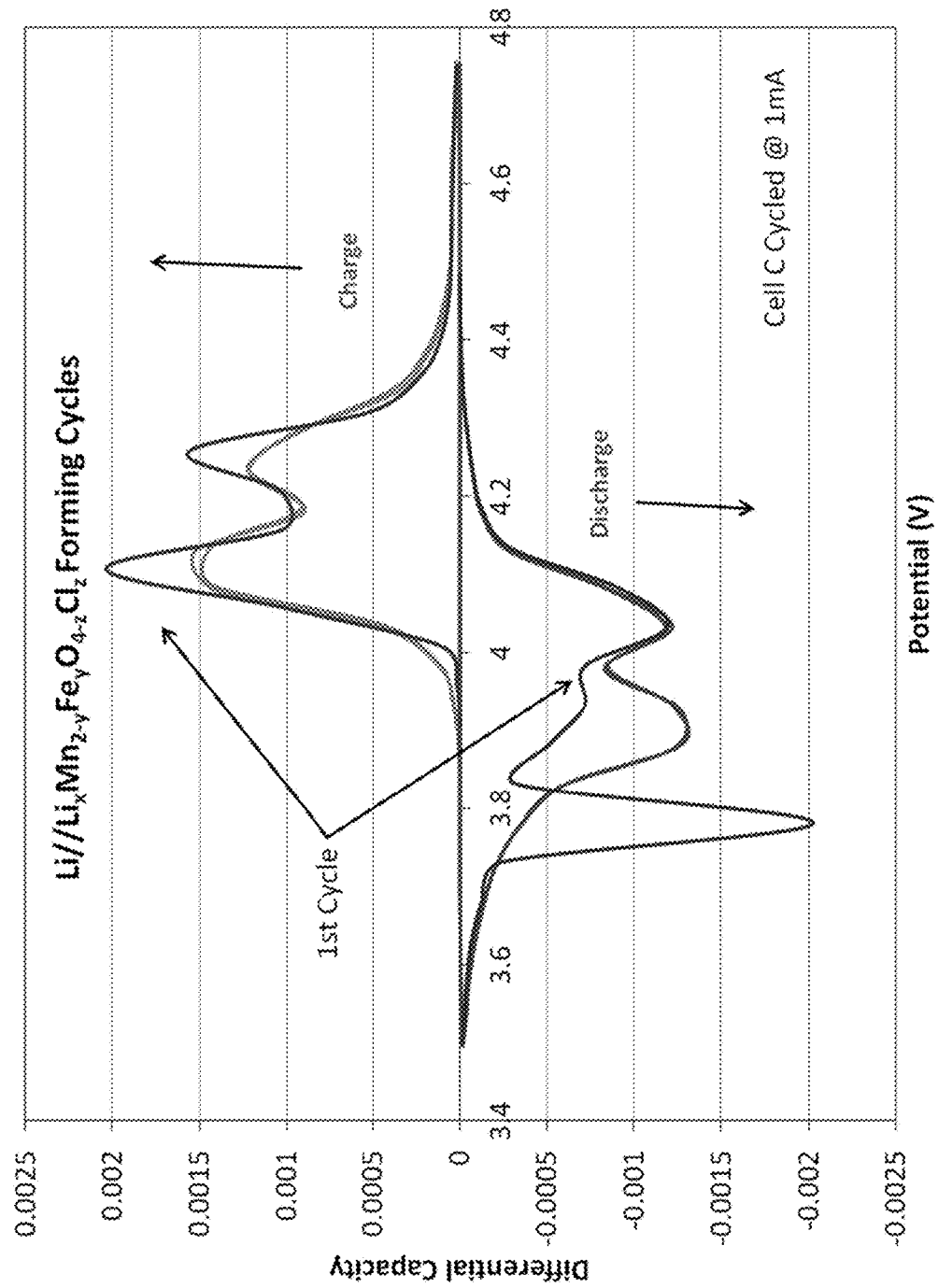
FIG. 9 is a differential capacity graph illustrating the forming cycle traces for a lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure. For this graph, the M in $Li_xMn_{2-y}M_yO_{4-z}Cl_z$ is Fe.
Figure 10:
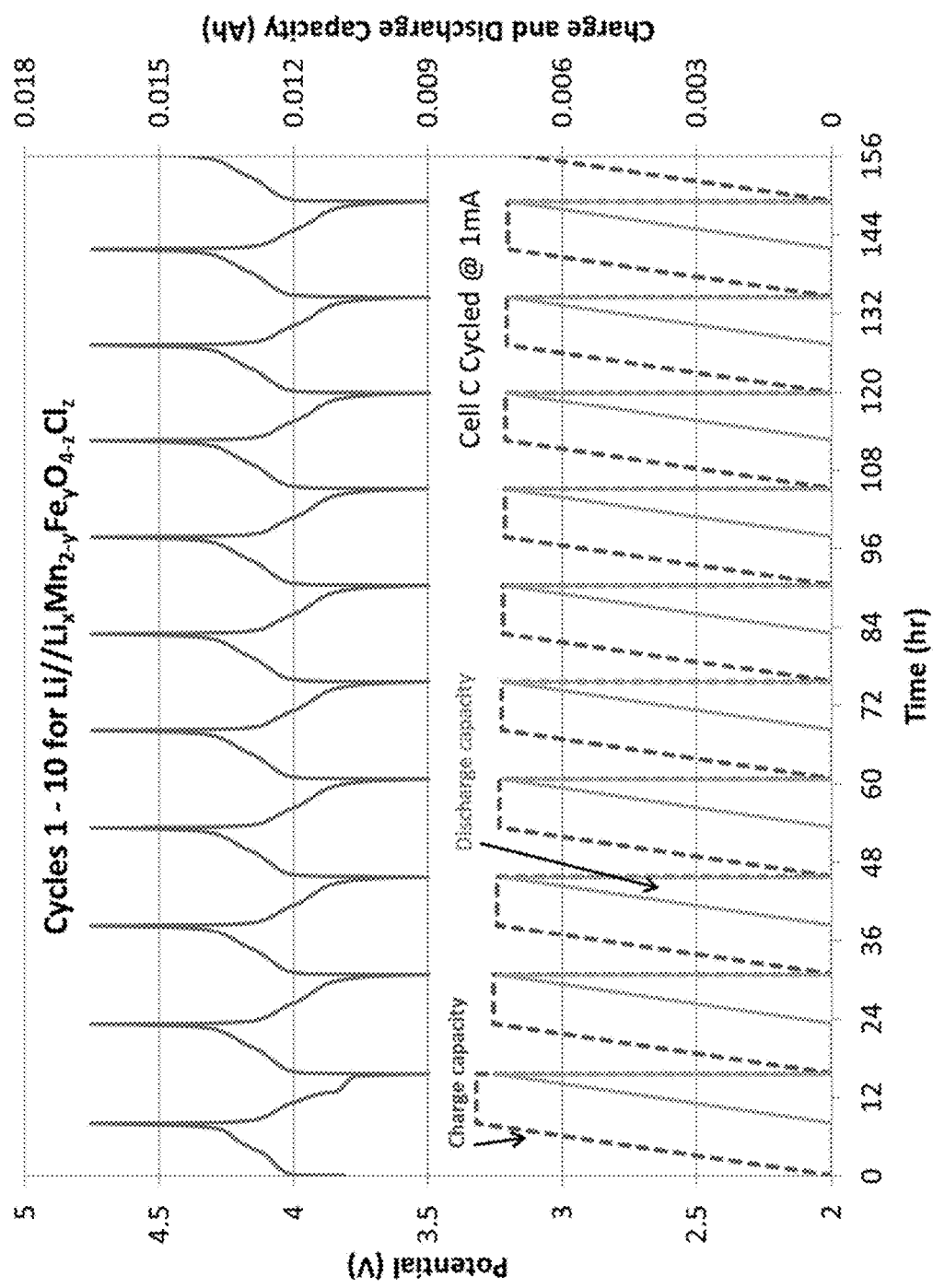
FIG. 10 is a plot containing the initial ten charge/discharge cycle potential trace, the charge capacity and delivered discharge capacity per cycle of an exemplary lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure. For this graph, the M in $Li_xMn_{2-y}M_yO_{4-z}Cl_z$ is Fe.

FIGS. 8 and 9 show exemplary forming cycle plots for lithium electrochemical cells fabricated with "B" and "O" site modified lithium manganese-based $AB_2O_4$ spinel cathode material, synthesized using the method described in the present disclosure. In FIG. 10 the forming cycle charge/discharge data is presented potential verses time and, in FIG. 11 the forming cycle charge/discharge data is presented as differential capacity.

Figure 11:
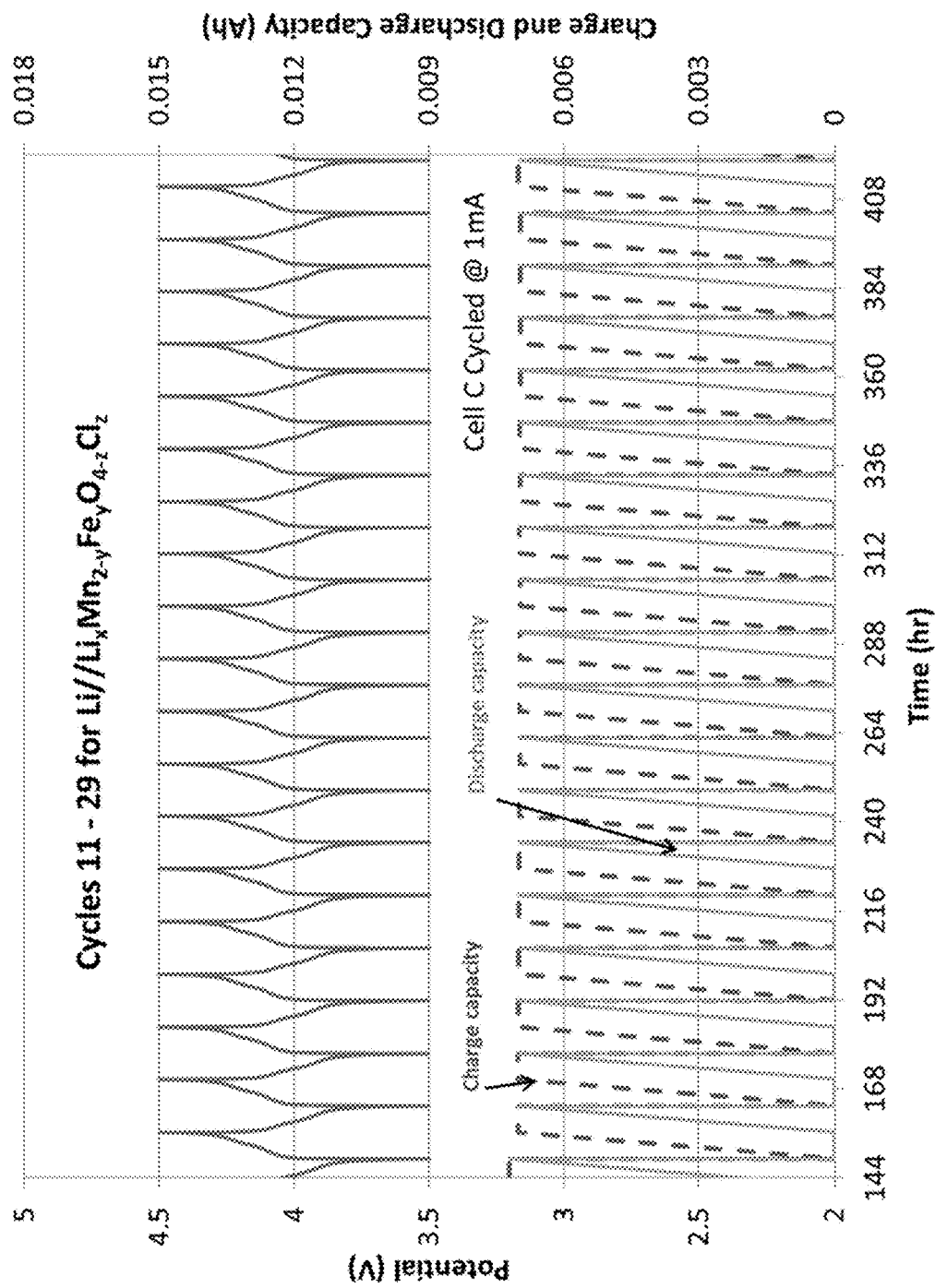
FIG. 11 is a plot containing the 11$^{th}$ to 29$^{th}$ charge/discharge cycle potential trace, the charge capacity and delivered discharge capacity per cycle of an exemplary lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure. For this graph, the M in $Li_xMn_{2-y}M_yO_{4-z}Cl_z$ is Fe.

FIGS. 10 and 11, shows the potential verses time data along with the charge capacity and delivered discharge capacity per cycle. FIG. 10 displays cycles 1 through 10 and FIG. 11 shows cycles 11 through 29.

Figure 12:
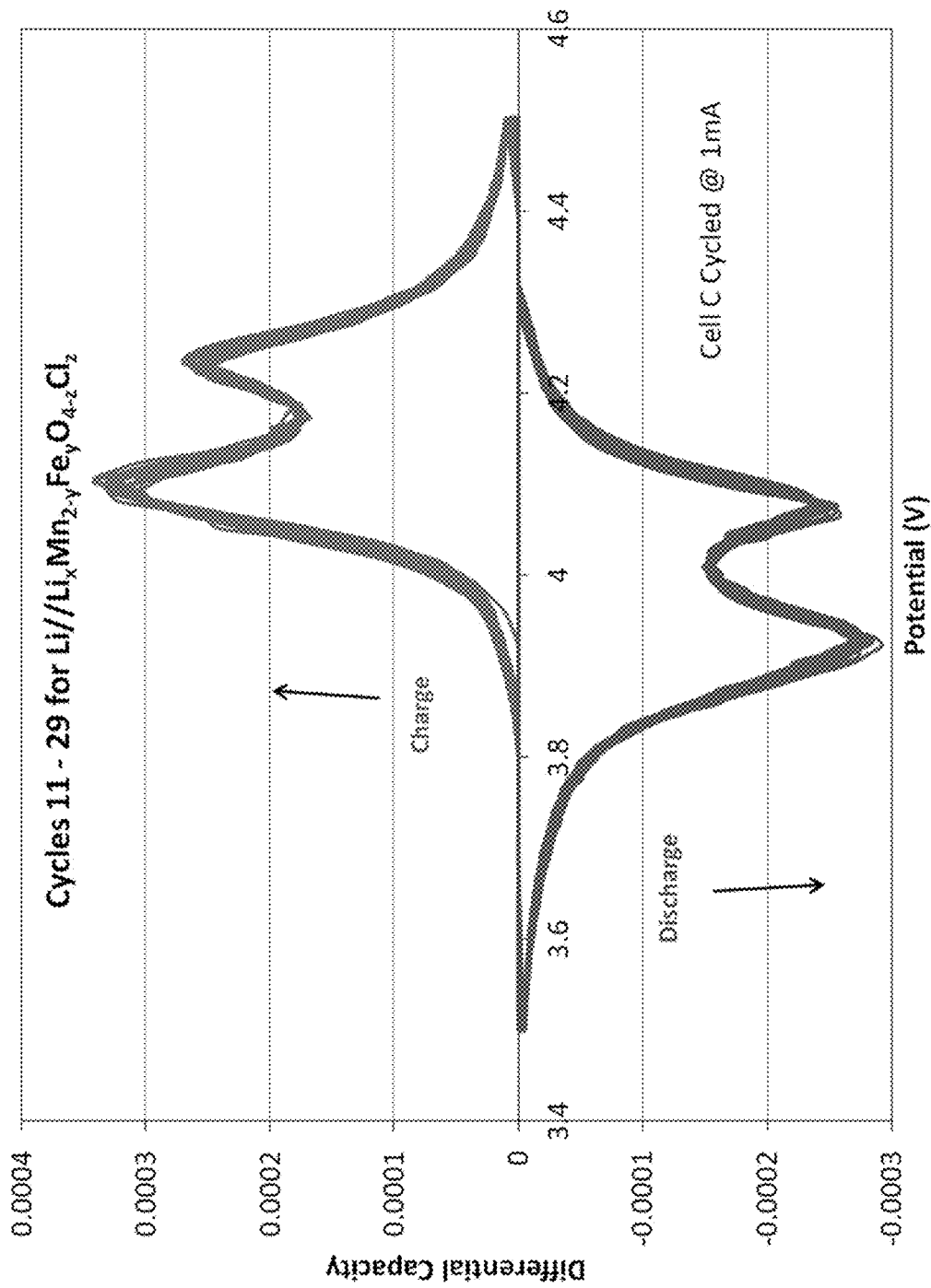
FIG. 12 is a differential capacity graph illustrating the 11$^{th}$ to 29$^{th}$ charge/discharge cycle traces for a lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure. For this graph, the M in $Li_xMn_{2-y}M_yO_{4-z}Cl_z$ is Fe.

FIG. 12 is a differential capacity graphs of cycles 11 through 29 illustrating exemplary cycle life traces for lithium cells containing a "B" and "O" site modified lithium manganese-based $AB_2O_4$ spinel cathode material according to an exemplary embodiment of the present disclosure. Differential capacity traces provides information regarding the underlying thermodynamics and kinetics of an electrochemical cell. The differential capacity data uses galvanostatic control of the electrochemical system being tested, and plots the capacity increase (charge) or decrease (discharge) as a function of potential. The figures show the stable thermodynamic behavior of the "B" and "O" site modified lithium manganese-based $AB_2O_4$ spinel cathode material according to an exemplary embodiment of the present disclosure, where $Li_xMn_{1.87}Fe_{0.13}O_{3.991}Cl_{0.009}$ is the active cathode material and lithium is the active anode material.

Figure 13:
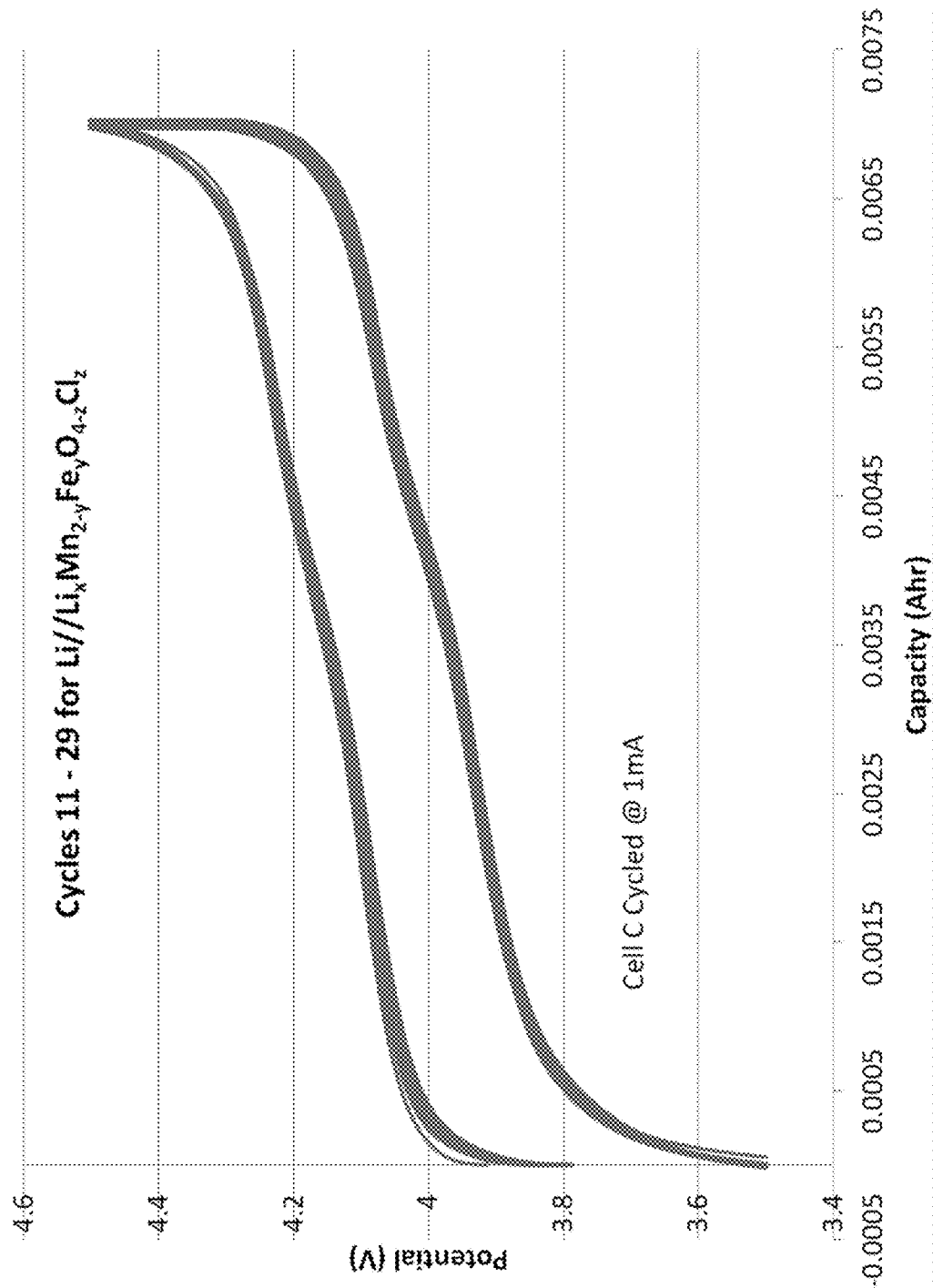
FIG. 13 is a representative hysteresis cycling cycle 11$^{th}$ to 29$^{th}$ (charge/discharge) curve illustrating cycle life traces for a lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure. For this graph, the M in $Li_xMn_{2-y}M_yO_{4-z}Cl_z$ is Fe.
Figure 14:
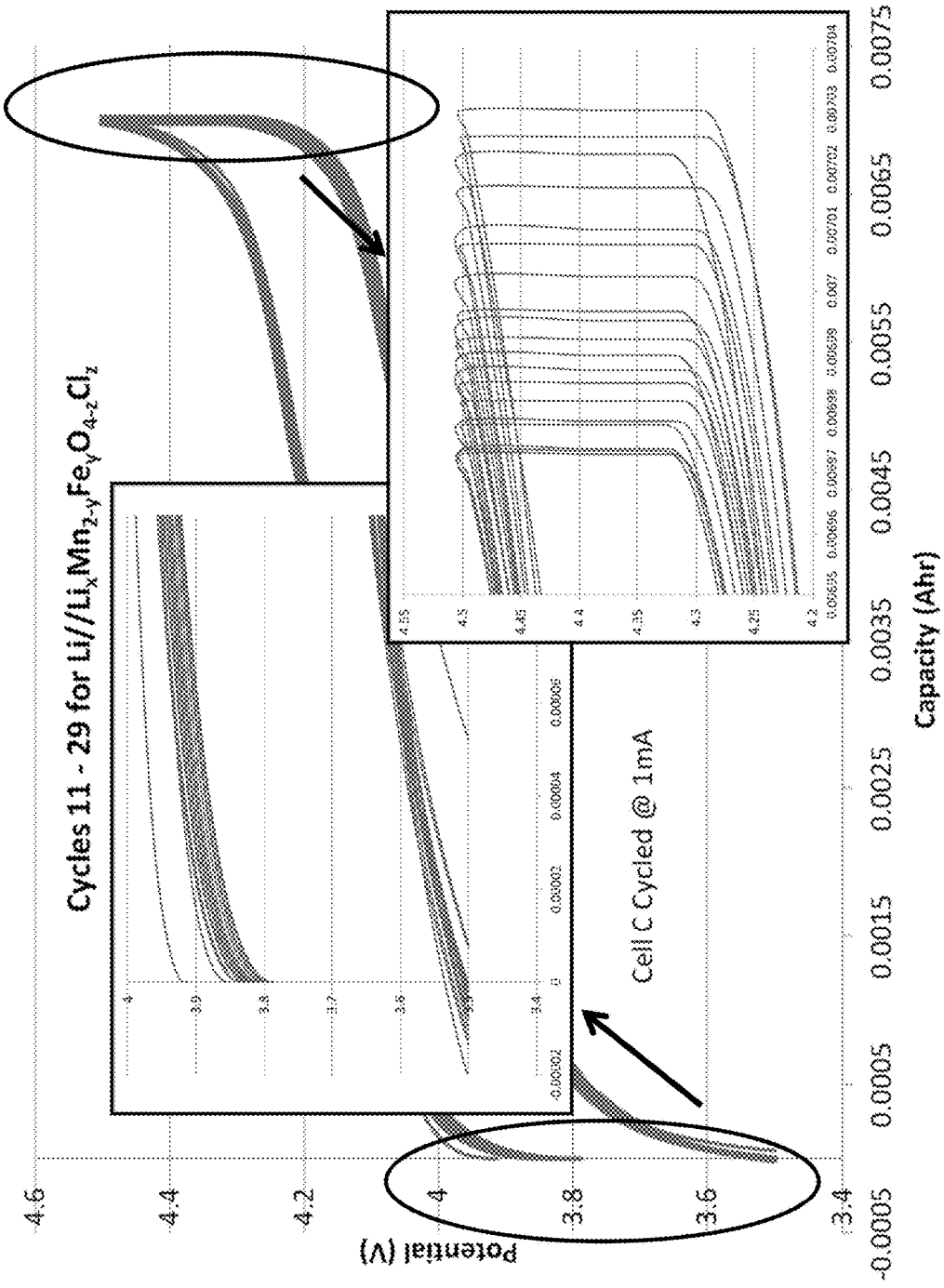
FIG. 14 is a representative hysteresis cycling (charge/discharge) curve illustrating cycle initiation and completion for a lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure. For this graph, the M in $Li_xMn_{2-y}M_yO_{4-z}Cl_z$ is Fe.

FIGS. 13 and 14 are the representative hysteresis cycling (charge/discharge) curve illustrating cycle life traces for a lithium cell containing a "B" and "O" site modified lithium manganese-based $AB_2O_4$ spinel cathode material according to an exemplary embodiment of the present disclosure. FIG. 13 is a graph of cycles 11 through 29 and FIG. 14 is the same graph with the initiation and completion of the charge and discharge highlighted.

FIGS. 15-20 show galvanostatic (charge/discharge) and differential capacity plots for lithium electrochemical cells fabricated with "B" and "O" site modified lithium manganese-based $AB_2O_4$ spinel cathode material, synthesized using the method described in the present disclosure. In the exemplary plots shown in FIGS. 15-20 iron is the Group VIII Period 4 "B" site element in the modified lithium manganese-based $AB_2O_4$ spinel cathode material. The chlorine to manganese ratios in the final product is 0.0098 while the iron to manganese ratio is 0.0923.

Figure 15:
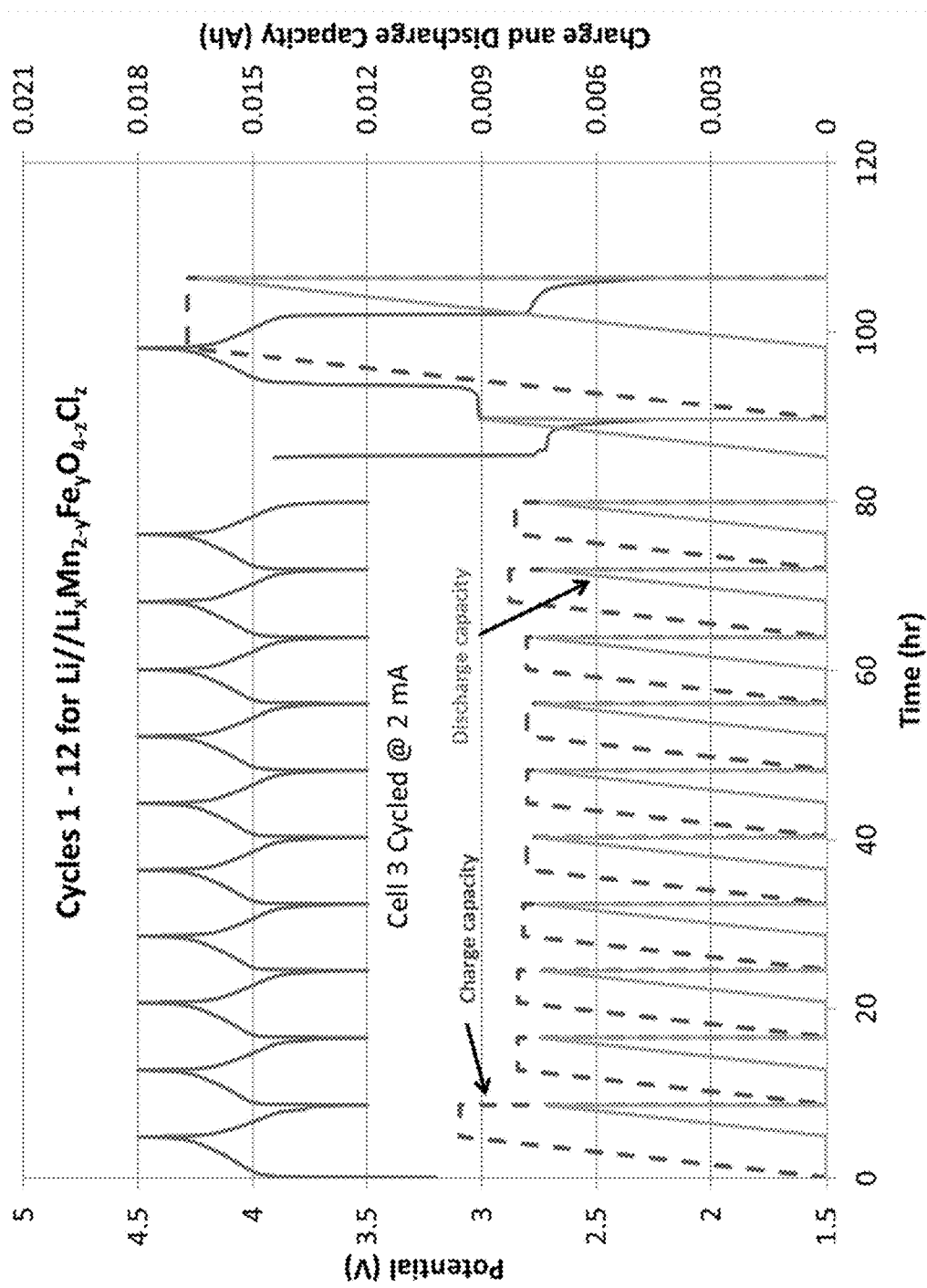
FIG. 15 is a plot containing the initial ten and 12$^{th}$ charge/discharge cycle potential trace, the charge capacity and delivered discharge capacity per cycle of an exemplary lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure. For this graph, the M in $Li_xMn_{2-y}M_yO_{4-z}Cl_z$ is Fe.
Figure 16:
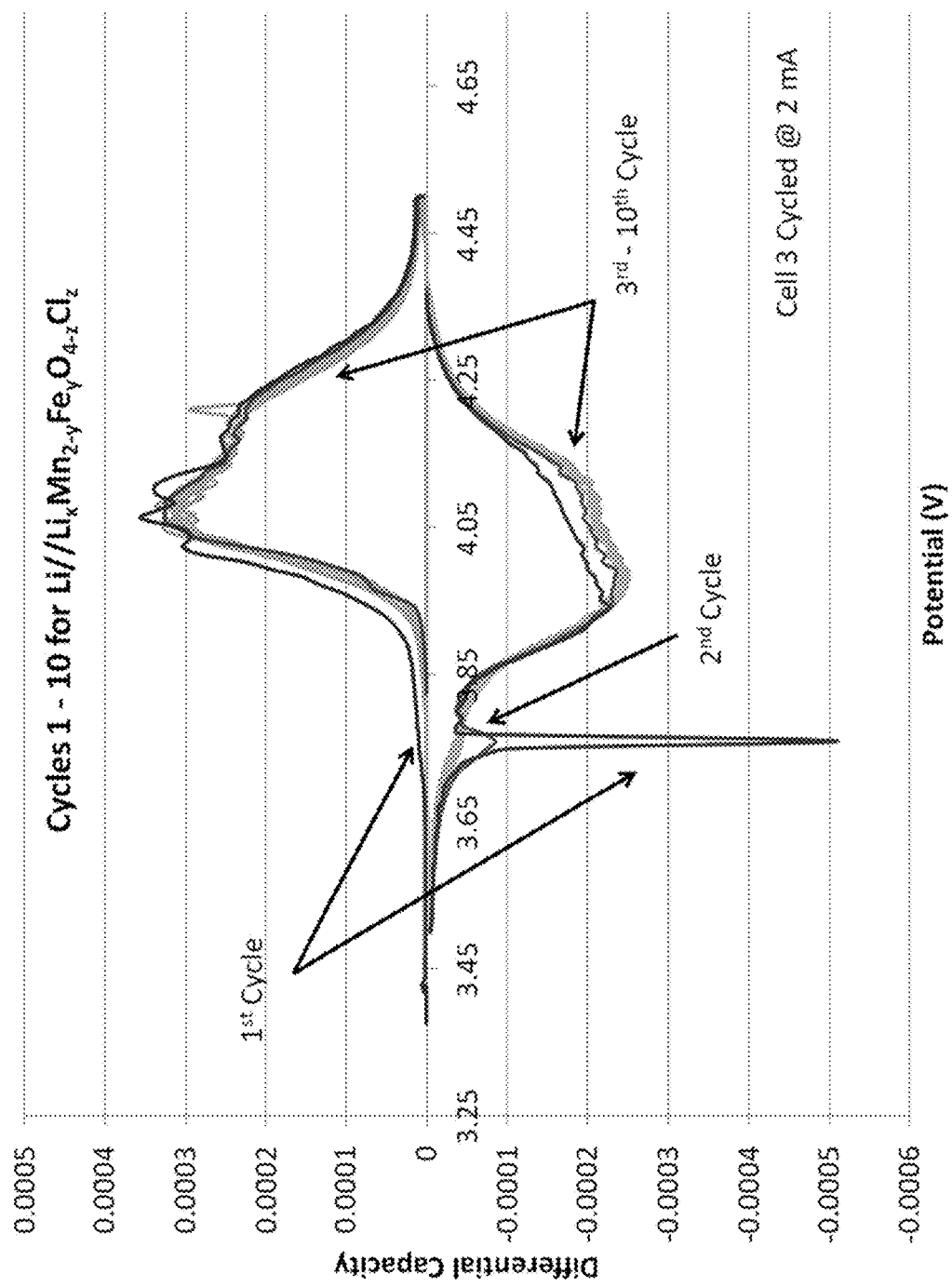
FIG. 16 is a plot containing the initial ten charge/discharge cycle potential trace, the charge capacity and delivered discharge capacity per cycle of an exemplary lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure. For this graph, the M in $Li_xMn_{2-y}M_yO_{4-z}Cl_z$ is Fe.

FIGS. 15 and 16 are plots containing the initial ten and 12$^{th}$ charge/discharge cycle potential trace, along with the charge capacity and delivered discharge capacity per cycle of an exemplary lithium cell containing a "B" and "O" site modified lithium manganese-based $AB_2O_4$ spinel cathode material according to an exemplary embodiment of the present disclosure. This plot shows the added capacity delivered by the system as a result of cycling to a 2.0 volt cut off. In FIG. 10 the charge/discharge cycle data is presented as potential verses time and, in FIG. 11 the charge/discharge cycle data is presented as differential capacity.

Figure 17:
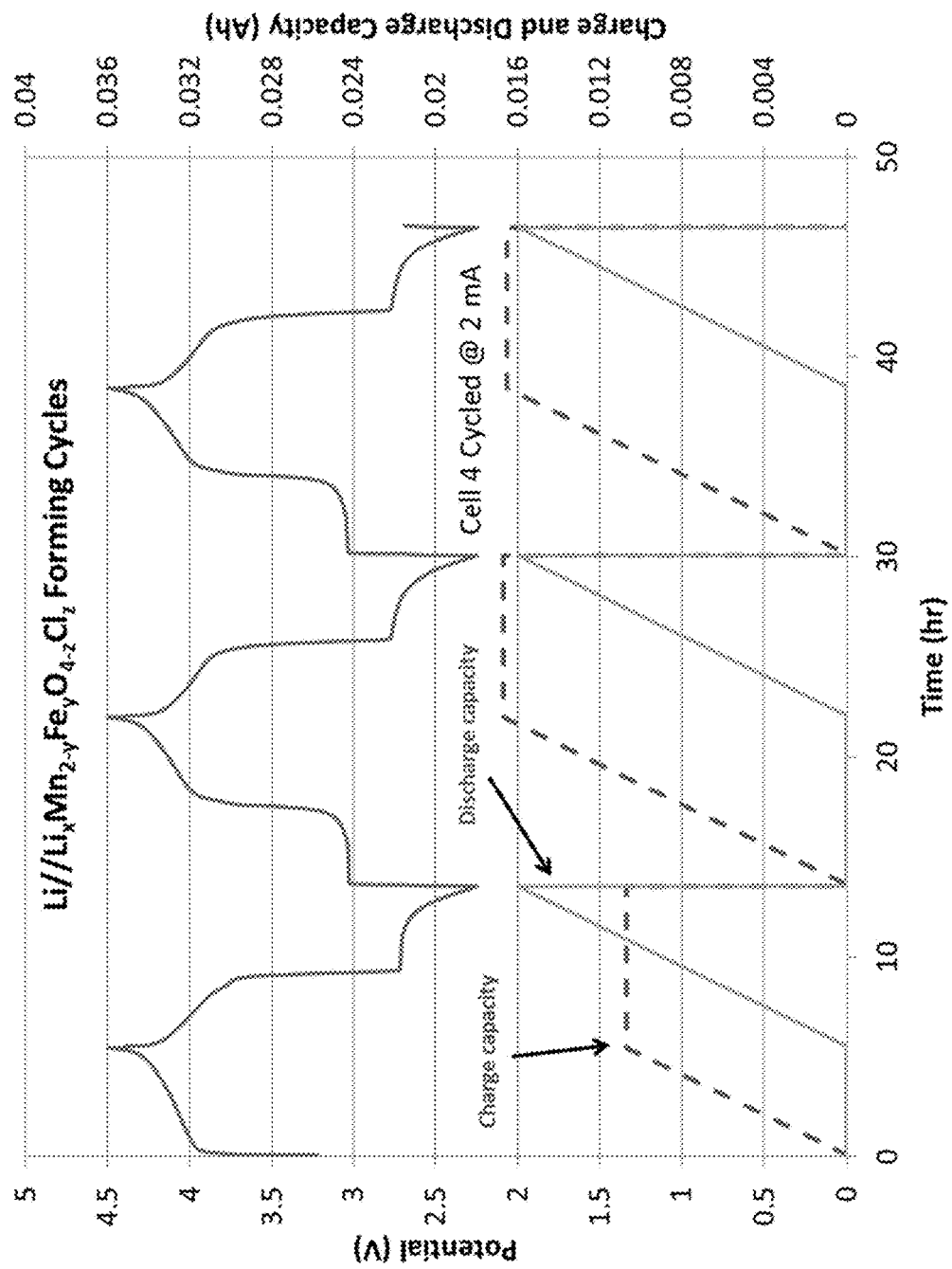
FIG. 17 is a graph illustrating representative forming cycles (charge/discharge) curves for a lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure cycled between 4.5 and 2.25 volts. For this graph, the M in $Li_xMn_{2-y}M_yO_{4-z}Cl_z$ is Fe.
Figure 18:
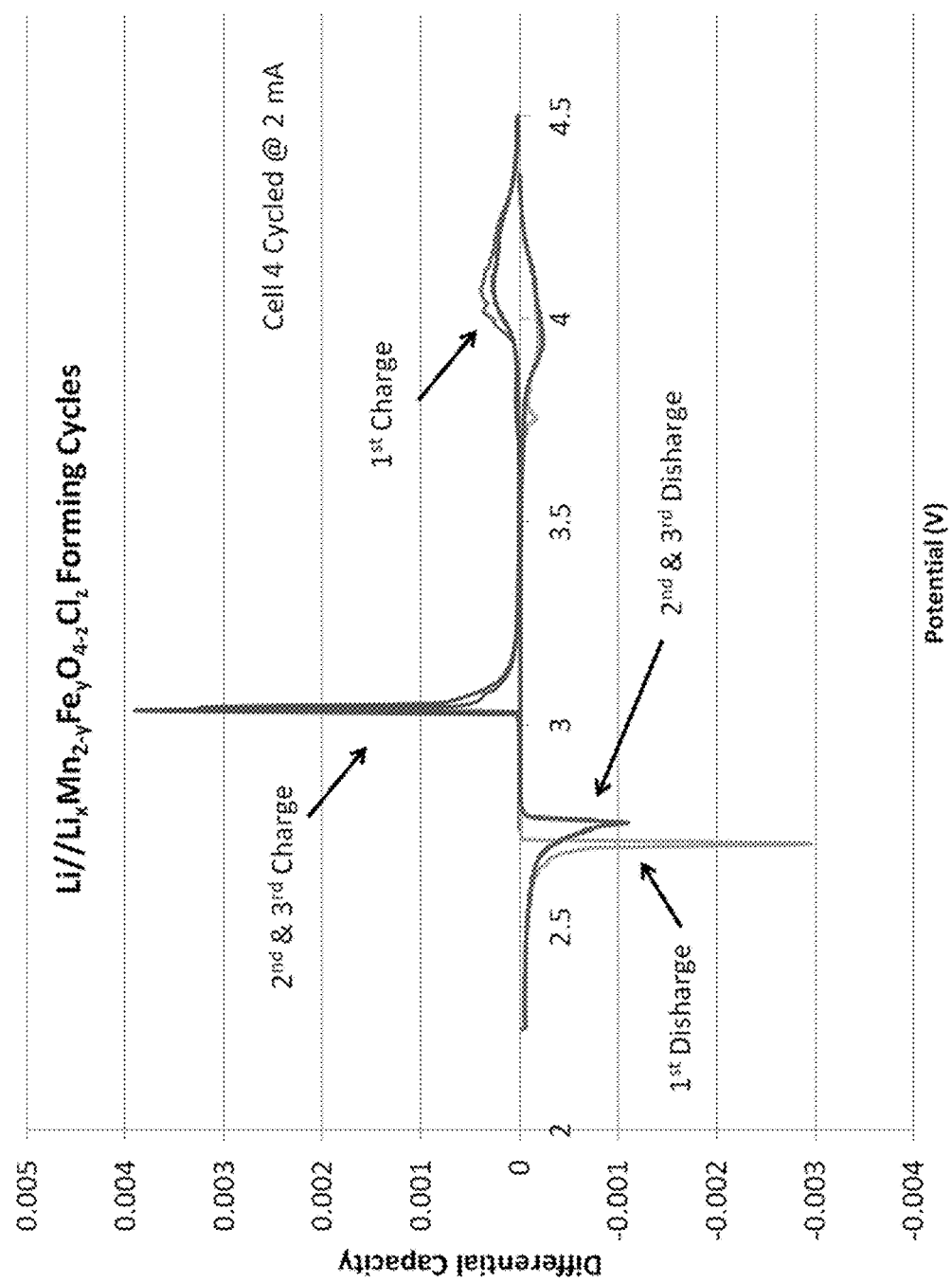
FIG. 18 is a differential capacity graph illustrating the forming cycle traces for a lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure cycled between 4.5 and 2.25 volts. For this graph, the M in $Li_xMn_{2-y}M_yO_{4-z}Cl_z$ is Fe.
Figure 19:
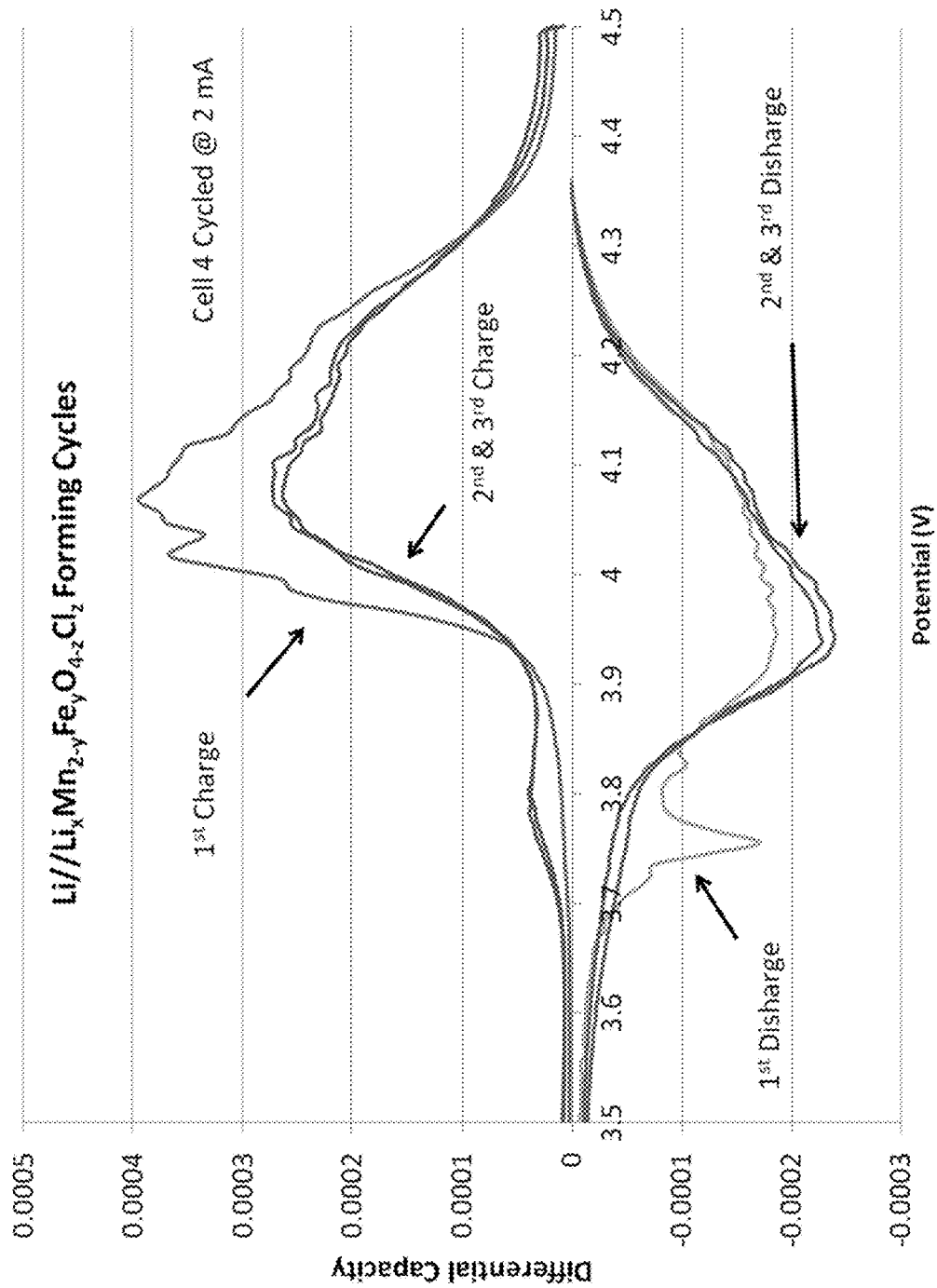
FIG. 19 is a differential capacity graph illustrating the high potential portion of the forming cycle traces for a lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure cycled between 4.5 and 2.25 volts. For this graph, the M in $Li_xMn_{2-y}M_yO_{4-z}Cl_z$ is Fe.
Figure 20:
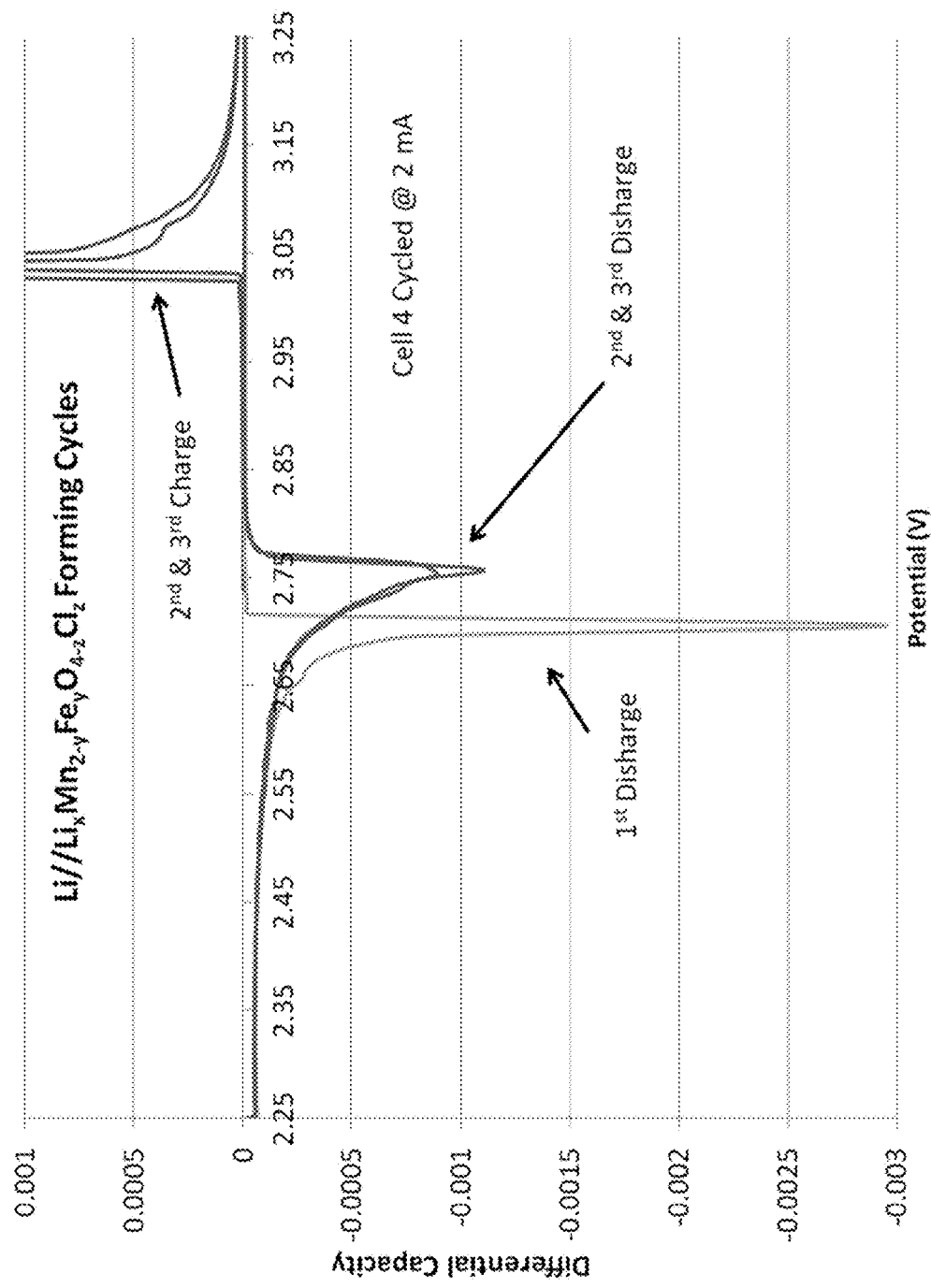
FIG. 20 is a differential capacity graph illustrating the low potential portion of the forming cycle traces for a lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure cycled between 4.5 and 2.25 volts. For this graph, the M in $Li_xMn_{2-y}M_yO_{4-z}Cl_z$ is Fe.

FIGS. 17 and 20 show exemplary cycle plots for lithium electrochemical cells fabricated with "B" and "O" site modified lithium manganese-based $AB_2O_4$ spinel cathode material, synthesized using the method described in the present disclosure where $Li_xMn_{1.83}Fe_{0.17}O_{3.981}Cl_{0.018}$ is the active cathode material and lithium is the active anode material. For this example the cell was charged to a potential of 4.5 volts and discharged to a potential of 2.25 volts. In FIG. 17 the forming cycle charge/discharge data is presented potential verses time and, in FIG. 18 the forming cycle charge/discharge data is presented as differential capacity. FIGS. 19 and 20 show the high potential and low potential portion of the data shown in FIG. 18 respectively.

FIGS. 21-24 show galvanostatic (charge/discharge) and differential capacity plots for lithium electrochemical cells fabricated with "B" and "O" site modified lithium manganese-based $AB_2O_4$ spinel cathode material, synthesized using the method described in the present disclosure. In the exemplary plots shown in FIGS. 21-24 cobalt is the Group VIII Period 4 "B" site element in the modified lithium manganese-based $AB_2O_4$ spinel cathode material. The chlorine to manganese ratios in the final product is 0.0021 while the cobalt to manganese ratio is 0.0873.

Figure 21:
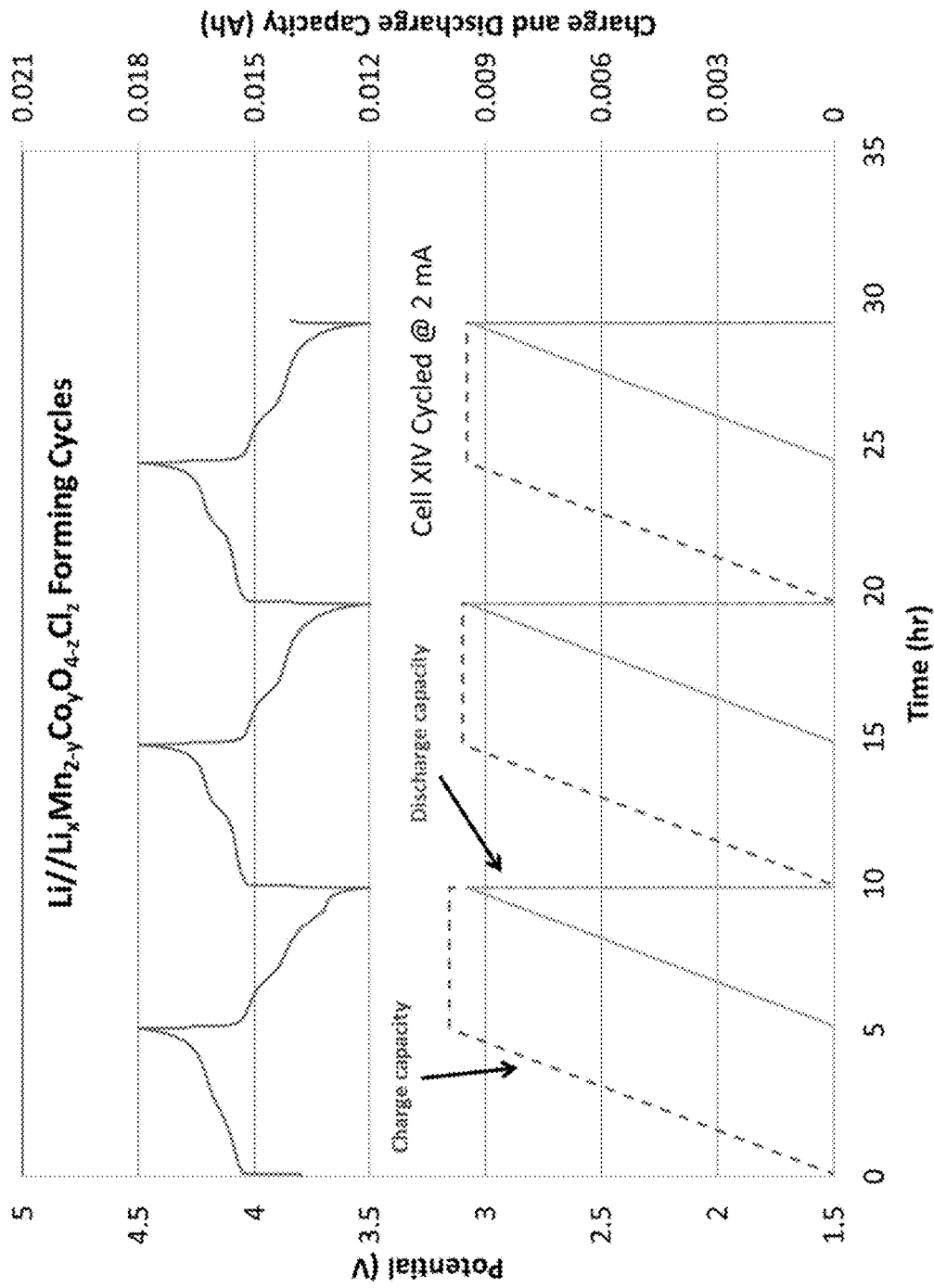
FIG. 21 is a graph illustrating representative forming cycles (charge/discharge) curves for a lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure cycled between 4.5 and 3.5 volts. For this graph, the M in $Li_xMn_{2-y}M_yO_{4-z}Cl_z$ is Co.
Figure 22:
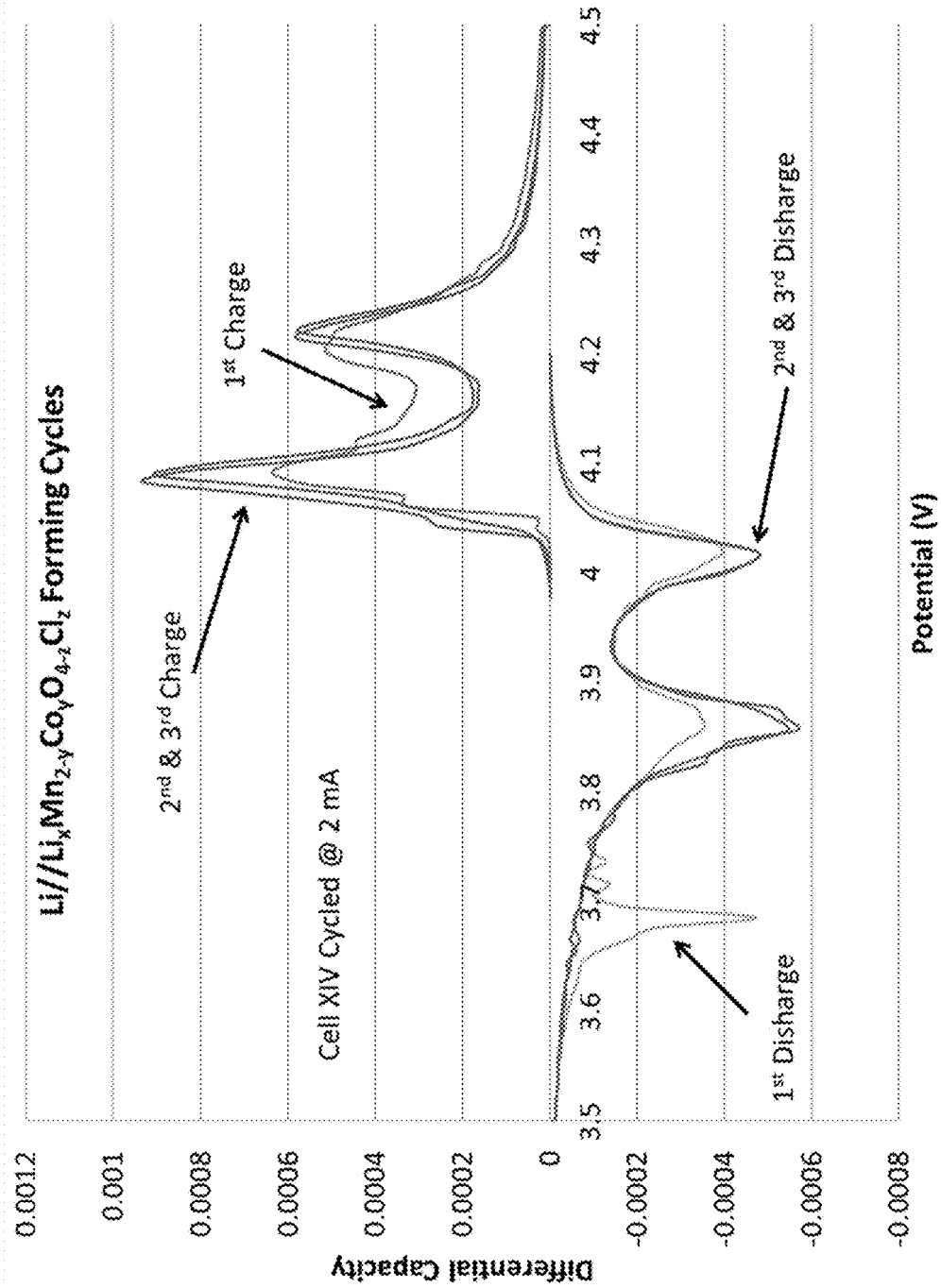
FIG. 22 is a differential capacity graph illustrating the forming cycle traces for a lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure cycled between 4.5 and 3.5 volts. For this graph, the M in $Li_xMn_{2-y}M_yO_{4-z}Cl_z$ is Co.

FIGS. 21 and 22 show exemplary cycle plots for lithium electrochemical cells fabricated with "B" and "O" site modified lithium manganese-based $AB_2O_4$ spinel cathode material, synthesized using the method described in the present disclosure where $Li_xMn_{1.84}Co_{0.16}O_{3.995}Cl_{0.005}$ is the active cathode material and lithium is the active anode material. For this example the cell was charged to a potential of 4.5 volts and discharged to a potential of 3.5 volts. In FIG. 21 the forming cycle charge/discharge data is presented potential verses time and, in FIG. 22 the forming cycle charge/discharge data is presented as differential capacity.

Figure 23:
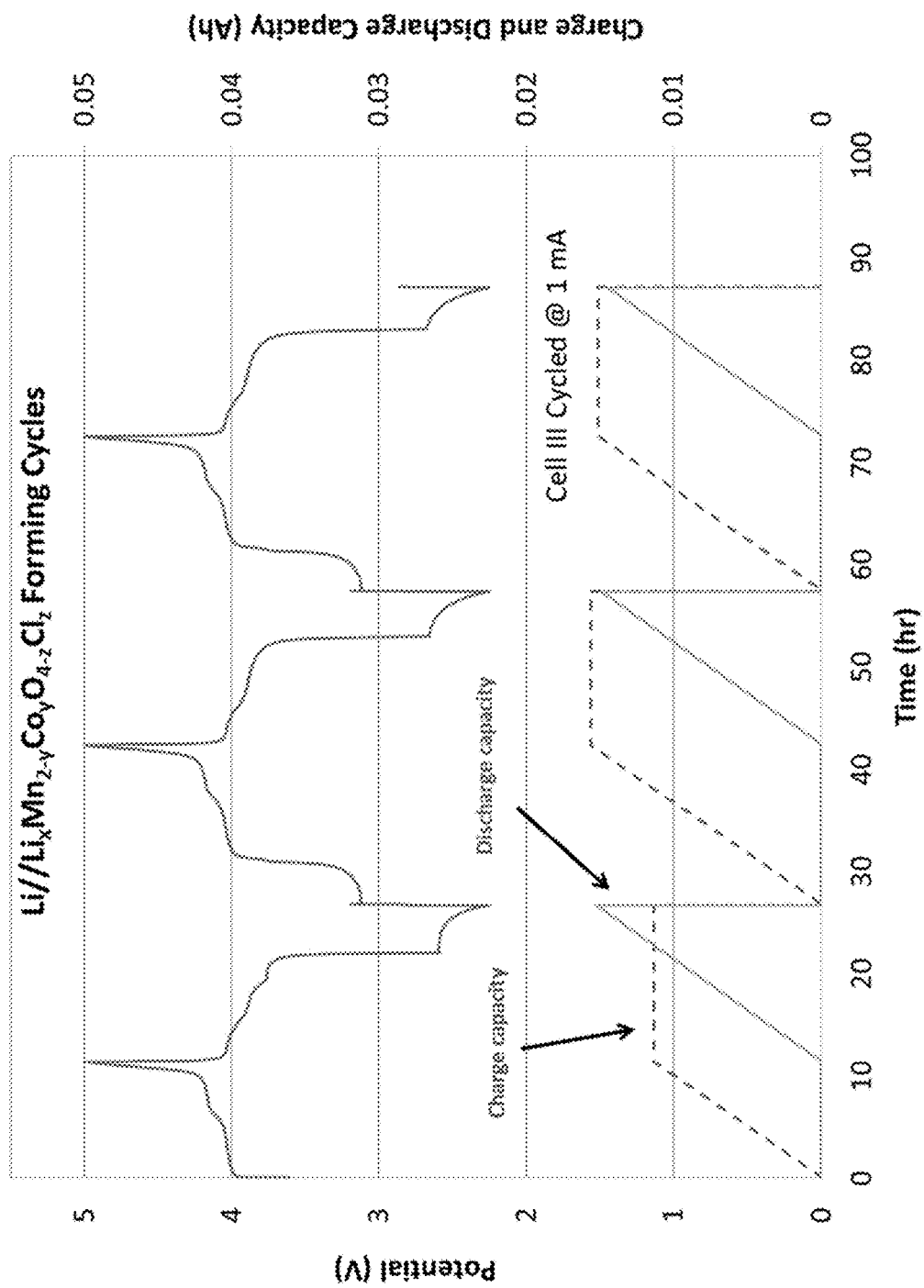
FIG. 23 is a graph illustrating representative forming cycles (charge/discharge) curves for a lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure cycled between 5.0 and 2.25 volts. For this graph, the M in $Li_xMn_{2-y}M_yO_{4-z}Cl_z$ is Co.
Figure 24:
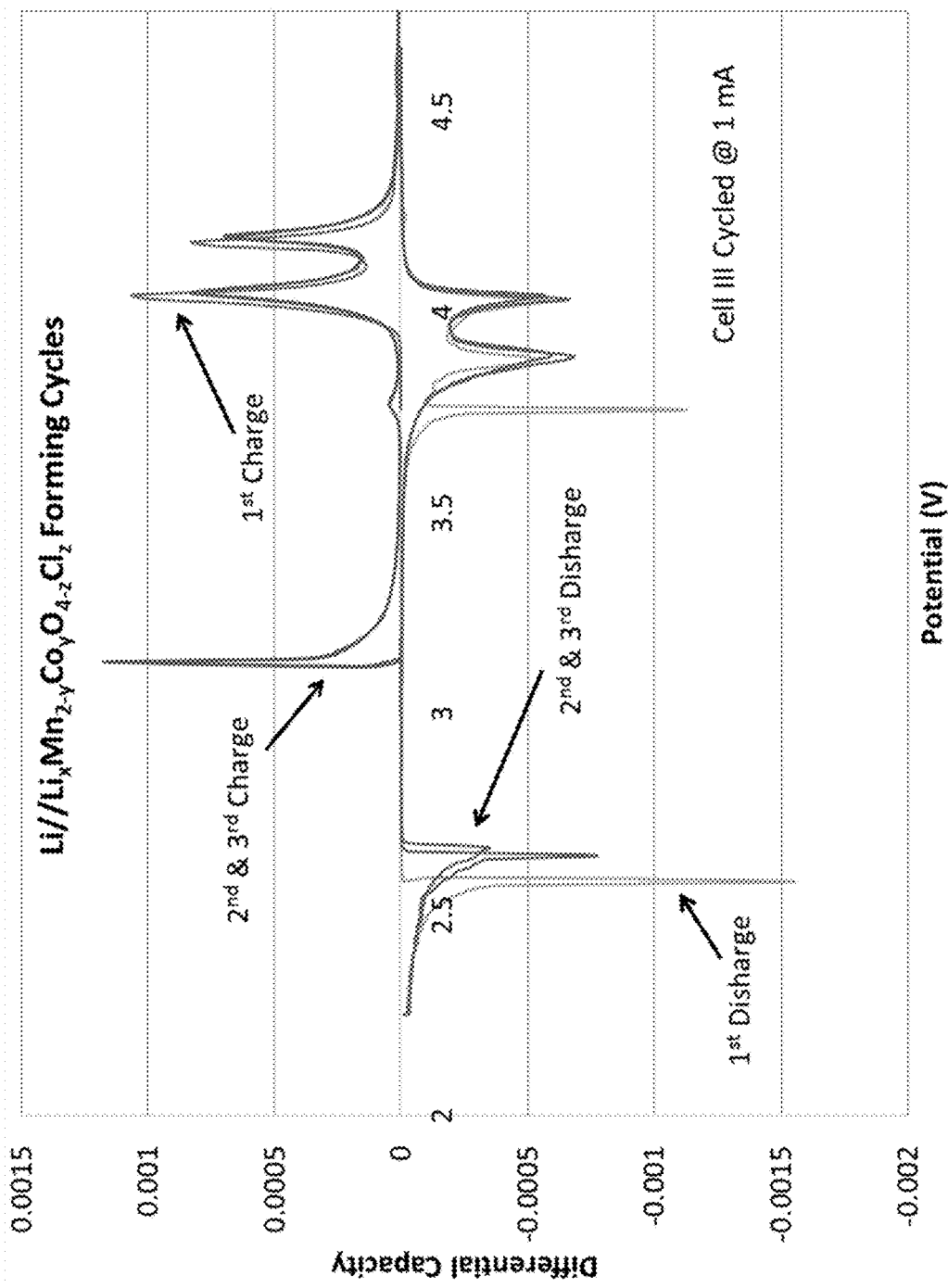
FIG. 24 is a differential capacity graph illustrating the forming cycle traces for a lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure cycled between 5.0 and 2.25 volts. For this graph, the M in $Li_xMn_{2-y}M_yO_{4-z}Cl_z$ is Co.

FIGS. 23 and 24 show exemplary cycle plots for lithium electrochemical cells fabricated with "B" and "O" site modified lithium manganese-based $AB_2O_4$ spinel cathode material, synthesized using the method described in the present disclosure where $Li_xMn_{1.84}Co_{0.16}O_{3.995}Cl_{0.005}$ is the active cathode material and lithium is the active anode material. For this example the cell was charged to a potential of 5.0 volts and discharged to a potential of 2.25 volts. In FIG. 23 the forming cycle charge/discharge data is presented potential verses time and, in FIG. 24 the forming cycle charge/discharge data is presented as differential capacity.

FIGS. 25-28 show galvanostatic (charge/discharge) and differential capacity plots for lithium electrochemical cells fabricated with "B" and "O" site modified lithium manganese-based $AB_2O_4$ spinel cathode material, synthesized using the method described in the present disclosure. In the exemplary plots shown in FIGS. 25-28 nickel is the Group VIII Period 4 "B" site element in the modified lithium manganese-based $AB_2O_4$ spinel cathode material. The chlorine to manganese ratios in the final product is 0.0030 while the nickel to manganese ratio is 0.0683.

Figure 25:
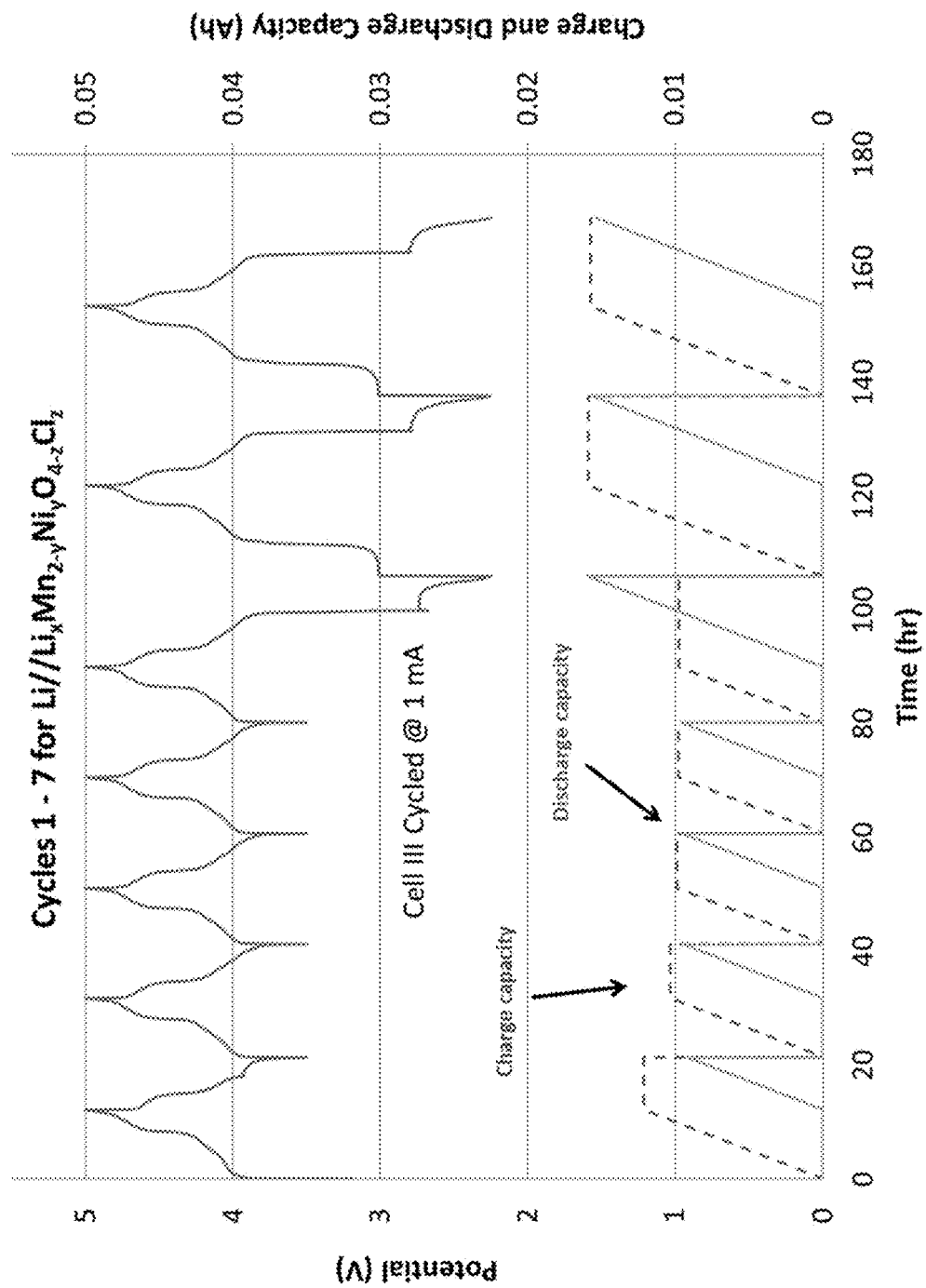
FIG. 25 is a plot containing the initial seven cycles (charge/discharge) curves for a lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure cycled between 5.0 and 3.5 volts then 5.0 and 2.25 volts. For this graph, the M in $Li_xMn_{2-y}M_yO_{4-z}Cl_z$ is Ni.
Figure 26:
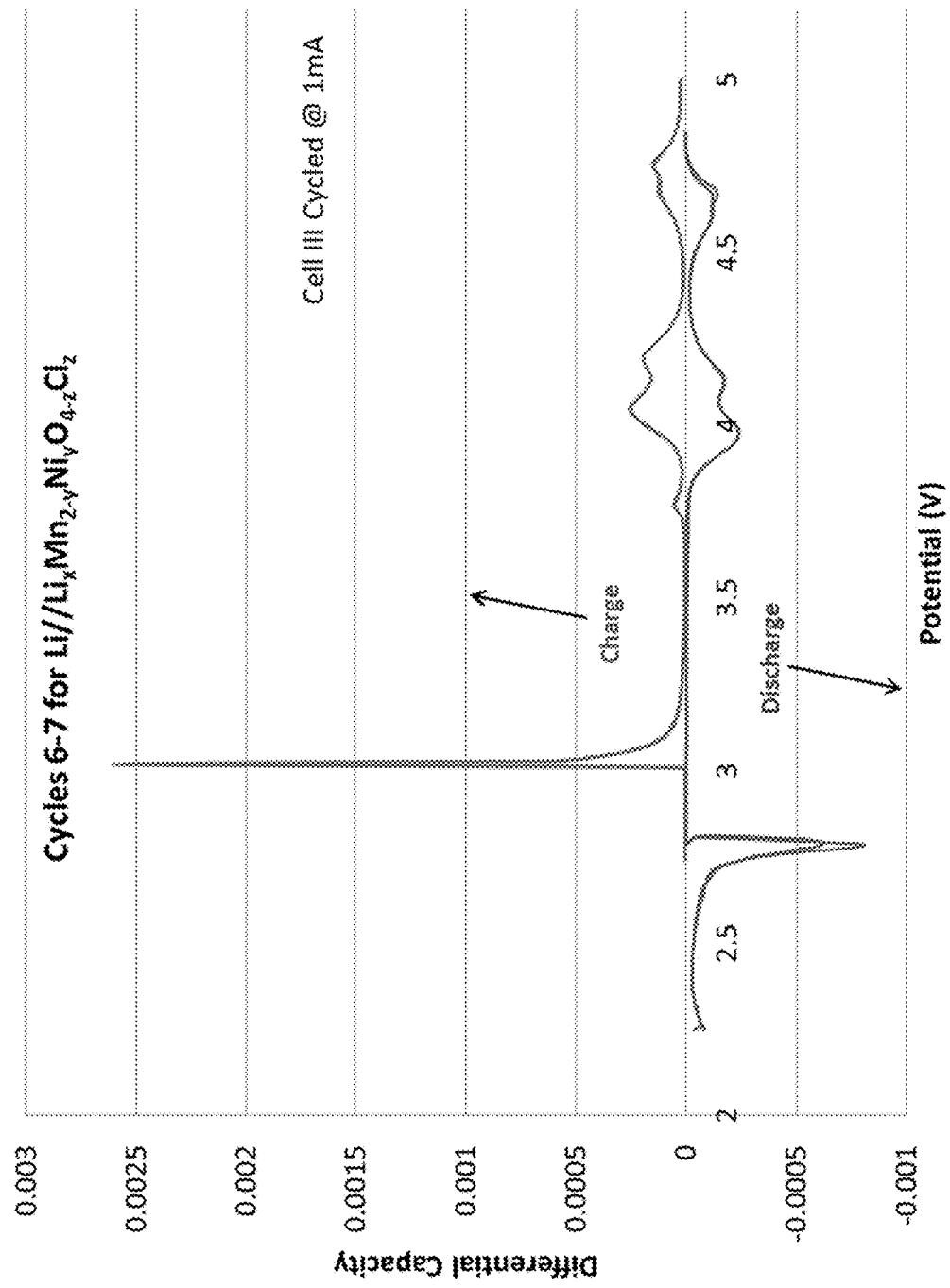
FIG. 26 is a differential capacity graph illustrating cycle traces 6 and 7 for a lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure cycled between 5.0 and 2.25 volts. For this graph, the M in $Li_xMn_{2-y}M_yO_{4-z}Cl_z$ is Ni.

FIGS. 25 and 26 show exemplary cycle plots for lithium electrochemical cells fabricated with "B" and "O" site modified lithium manganese-based $AB_2O_4$ spinel cathode material, synthesized using the method described in the present disclosure where $Li_xMn_{1.87}Ni_{0.13}O_{3.994}Cl_{0.006}$ is the active cathode material and lithium is the active anode material. For this example the cell was charged to a potential of 5.0 volts and discharged to a potential of 3.5 volts for the first four cycles then charged to a potential of 5.0 volts and discharged to a potential of 2.25 volts. In FIG. 25 the cycle charge/discharge data is presented potential verses time and, in FIG. 26 the cycle charge/discharge data is presented as differential capacity.

Figure 27:
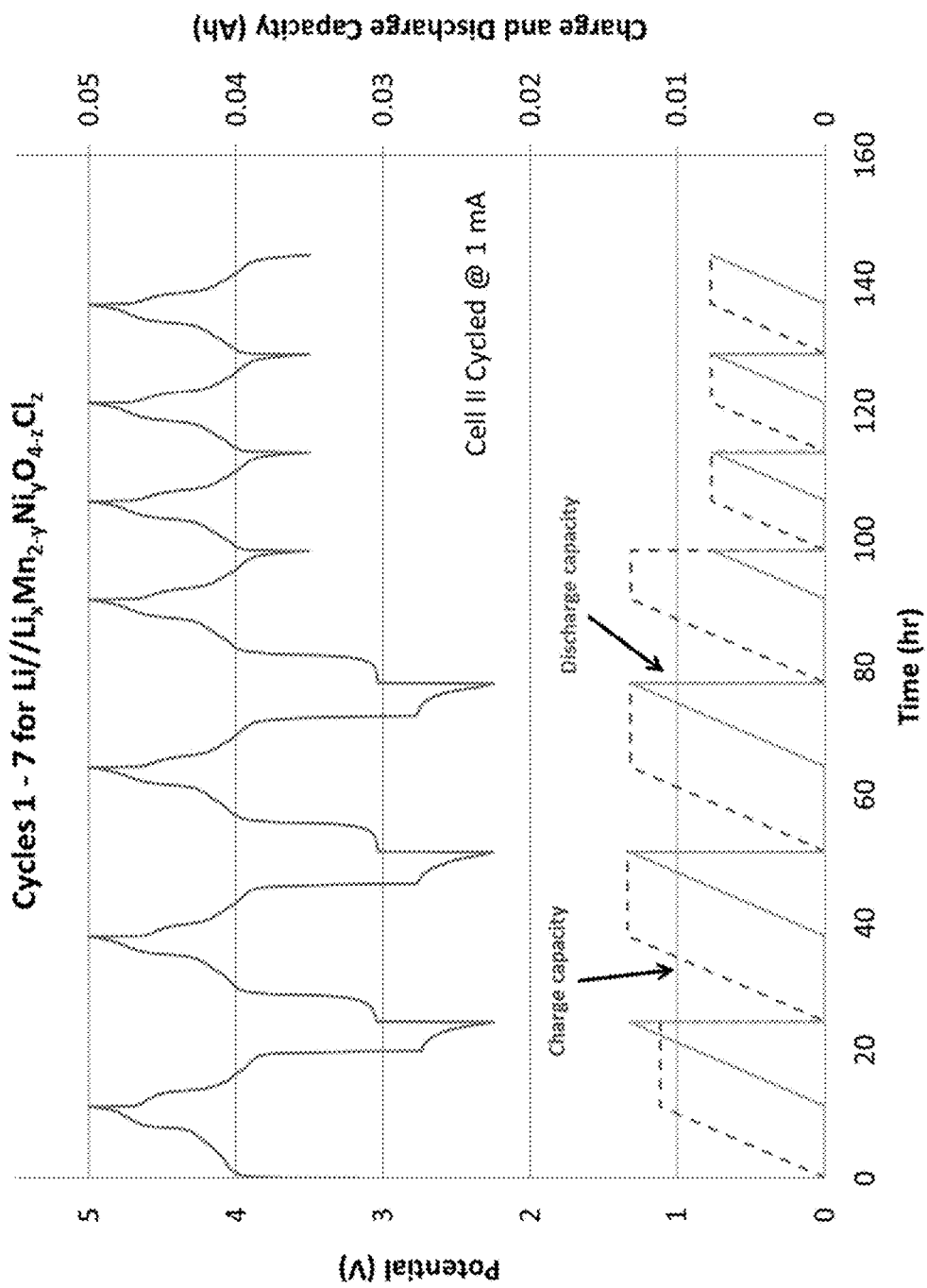
FIG. 27 is a plot containing the initial seven cycles (charge/discharge) curves for a lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure cycled between 5.0 and 2.25 volts then 5.0 and 3.5 volts. For this graph, the M in $Li_xMn_{2-y}M_yO_{4-z}Cl_z$ is Ni.
Figure 28:
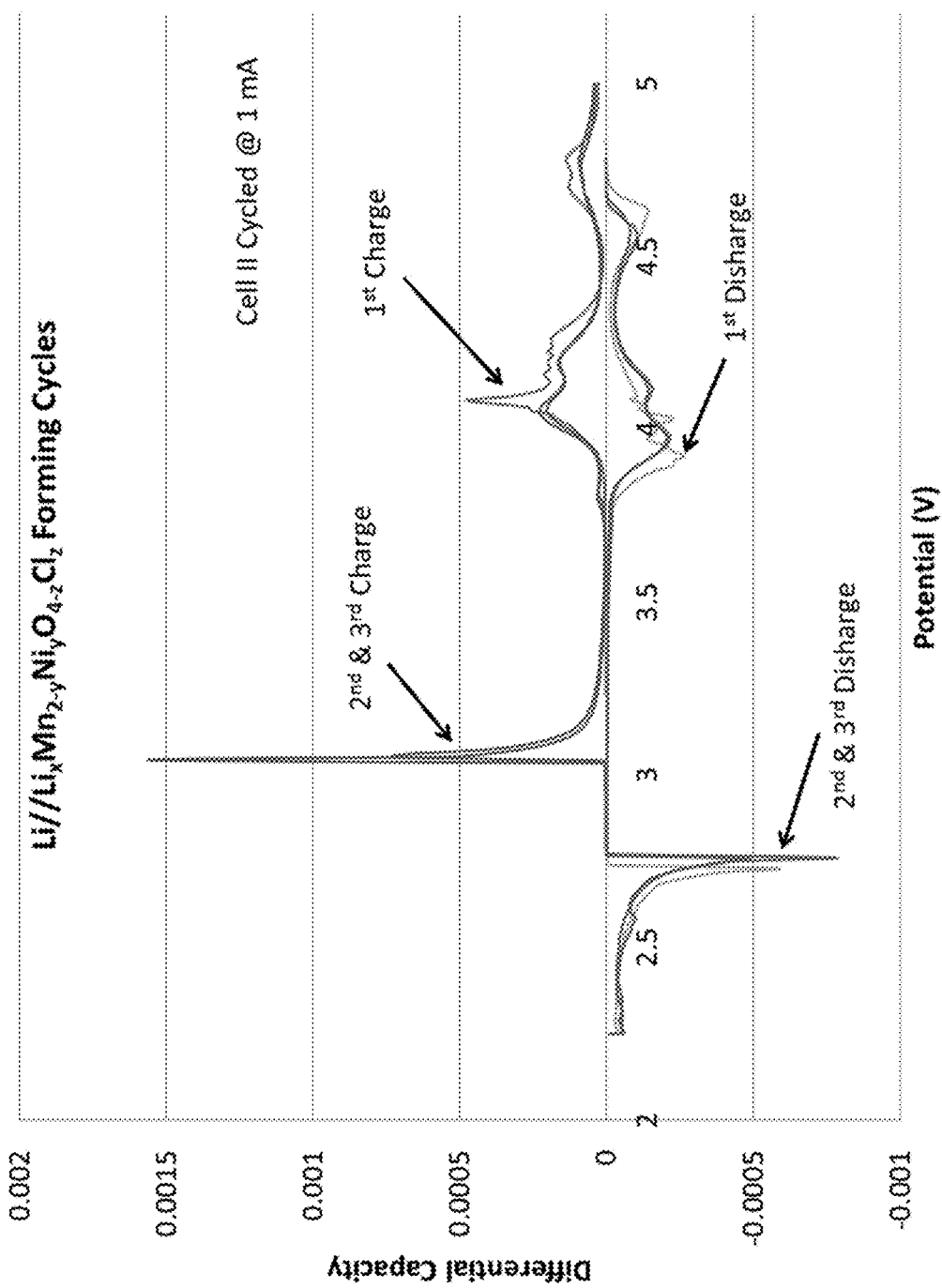
FIG. 28 is a differential capacity graph illustrating the forming cycles for a lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure cycled between 5.0 and 2.25 volts. For this graph, the M in $Li_xMn_{2-y}M_yO_{4-z}Cl_z$ is Ni.

FIGS. 27 and 28 show exemplary cycle plots for lithium electrochemical cells fabricated with "B" and "O" site modified lithium manganese-based $AB_2O_4$ spinel cathode material, synthesized using the method described in the present disclosure where $Li_xMn_{1.87}Ni_{0.13}O_{3.994}Cl_{0.006}$ is the active cathode material and lithium is the active anode material. For this example the cell was charged to a potential of 5.0 volts and discharged to a potential of 2.25 volts then charged to a potential of 5.0 volts and discharged to a potential of 3.5 volts. In FIG. 27 the cycle charge/discharge data is presented potential verses time and, in FIG. 28 the cycle charge/discharge data is presented as differential capacity.

Figure 29:
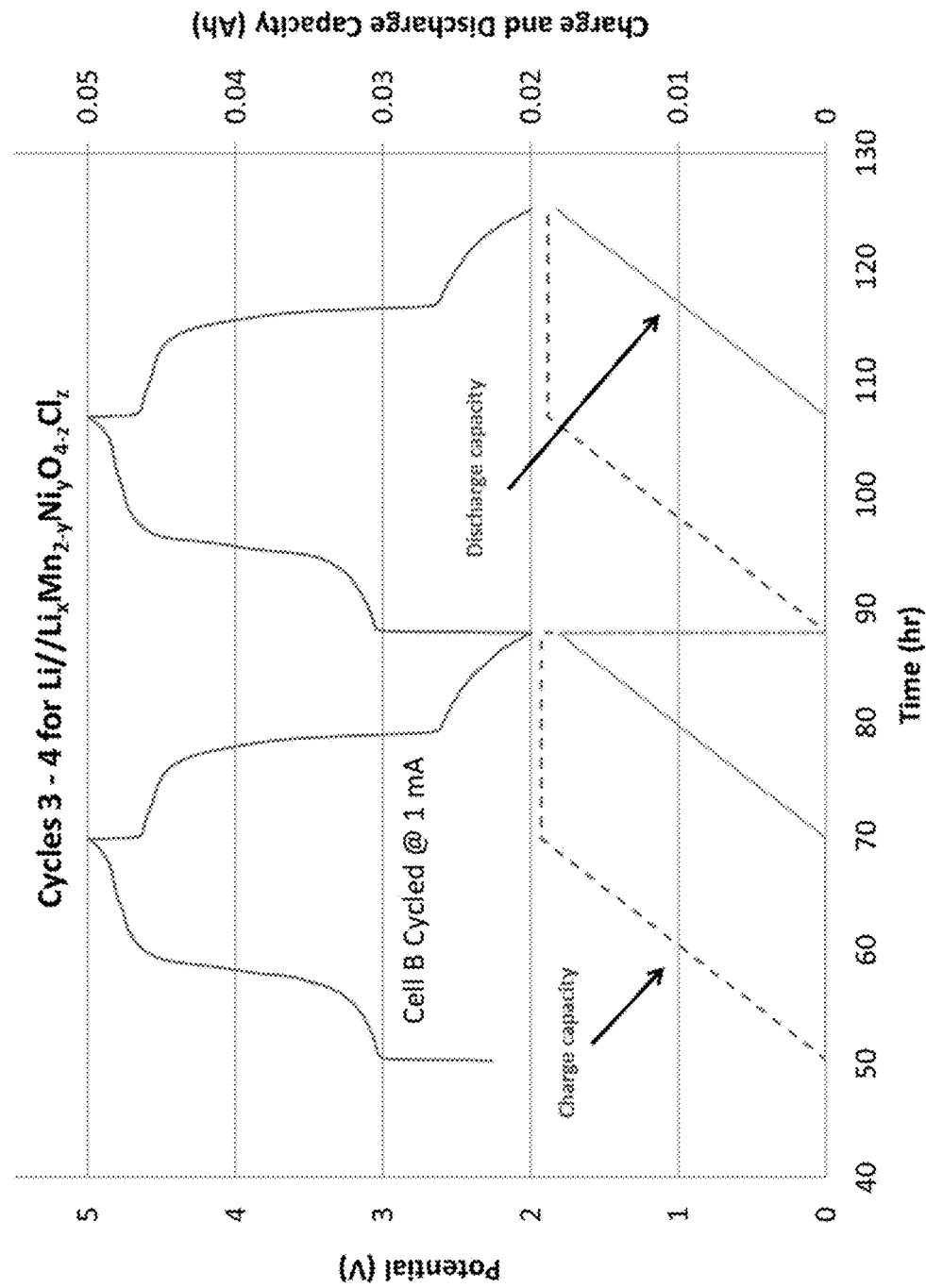
FIG. 29 is a plot containing cycles 3 and 4 (charge/discharge) curves for a lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure cycled between 5.0 and 2.0 volts. For this graph, the M in $Li_xMn_{2-y}M_yO_{4-z}Cl_z$ is Ni.
Figure 30:
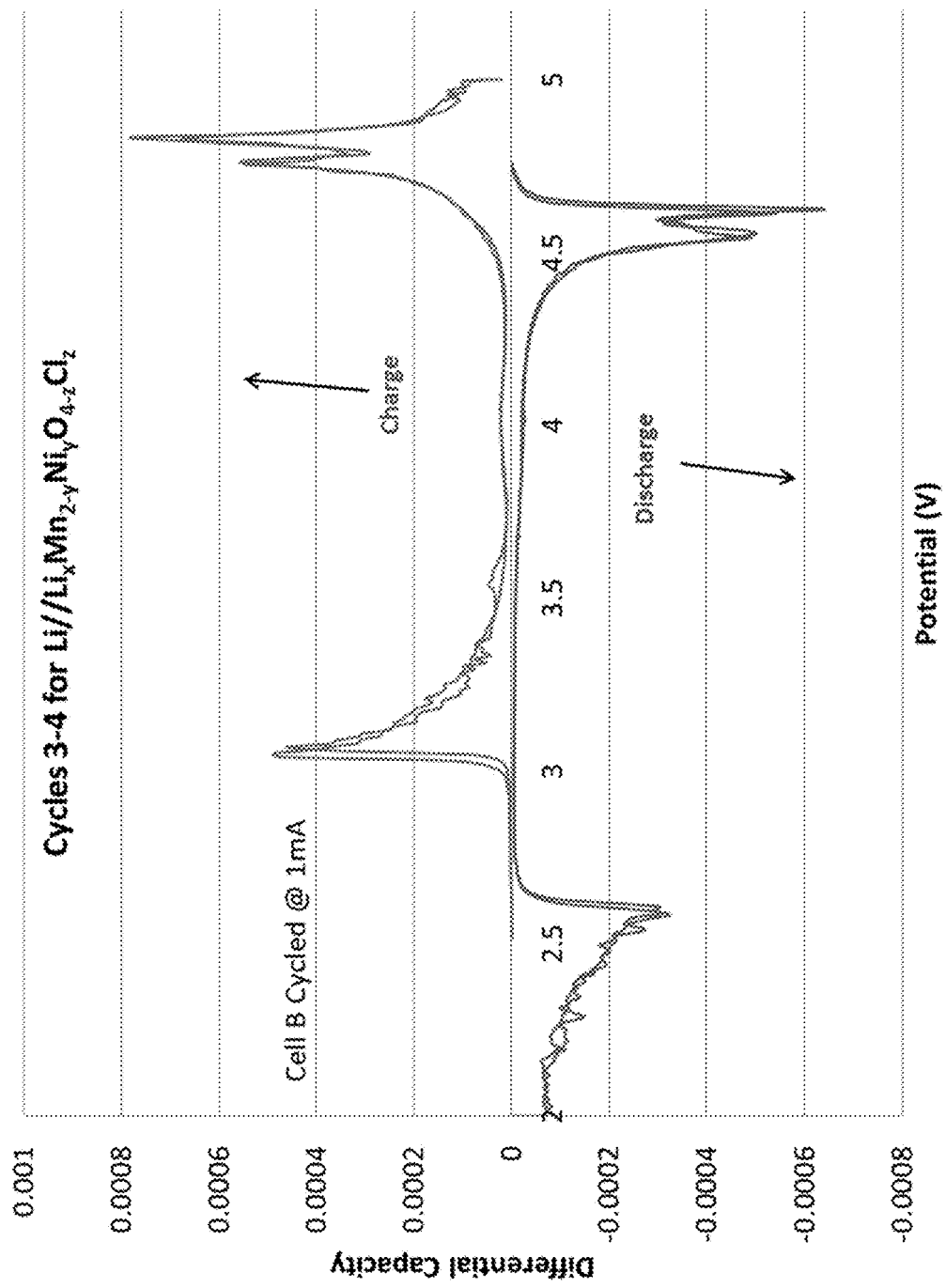
FIG. 30 is a differential capacity graph illustrating cycles 3 and 4 for a lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure cycled between 5.0 and 2.0 volts. For this graph, the M in $Li_xMn_{2-y}M_yO_{4-z}Cl_z$ is Ni.

FIGS. 29 and 30 show galvanostatic (charge/discharge) and differential capacity plots for lithium electrochemical cells fabricated with "B" and "O" site modified lithium manganese-based $AB_2O_4$ spinel cathode material, synthesized using the method described in the present disclosure. In the exemplary plots shown in FIGS. 29 and 30 nickel is the Group VIII Period 4 "B" site element in the modified lithium manganese-based $AB_2O_4$ spinel cathode material. The chlorine to manganese ratios in the final product is 0.0132 while the nickel to manganese ratio is 0.4043.

FIGS. 29 and 30 show exemplary cycle plots for lithium electrochemical cells fabricated with "B" and "O" site modified lithium manganese-based $AB_2O_4$ spinel cathode material, synthesized using the method described in the present disclosure where $Li_xMn_{1.42}Ni_{0.58}O_{3.981}Cl_{0.019}$ is the active cathode material and lithium is the active anode material. For this example the cell was charged to a potential of 5.0 volts and discharged to a potential of 2.0 volts. In FIG. 29 the cycle charge/discharge data is presented potential verses time and, in FIG. 30 the cycle charge/discharge data is presented as differential capacity.

Figure 31:
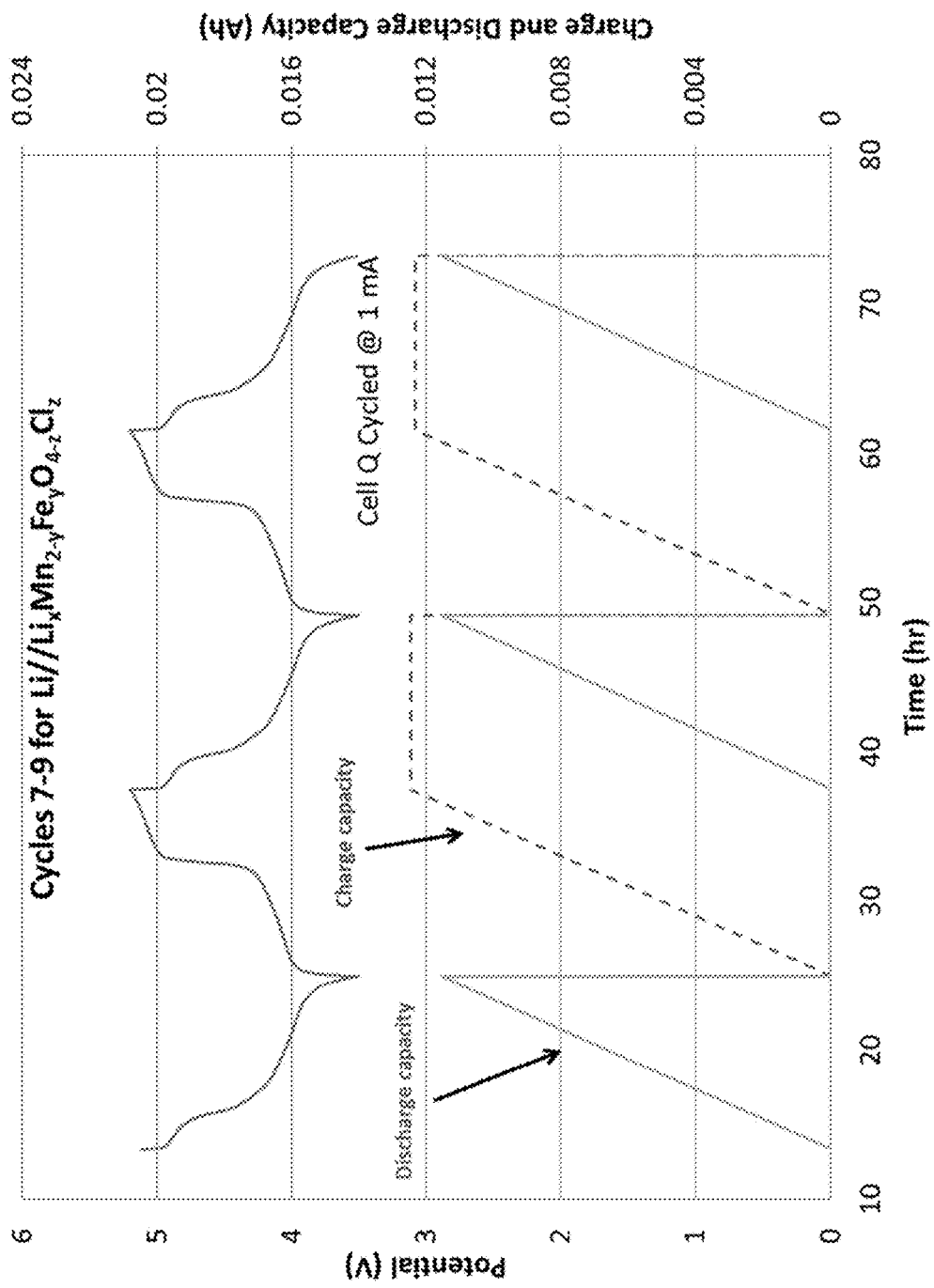
FIG. 31 is a plot containing cycles 7 to 9 (charge/discharge) curves for a lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure cycled between 5.2 and 3.5 volts. For this graph, the M in $Li_xMn_{2-y}M_yO_{4-z}Cl_z$ is Fe.
Figure 32:
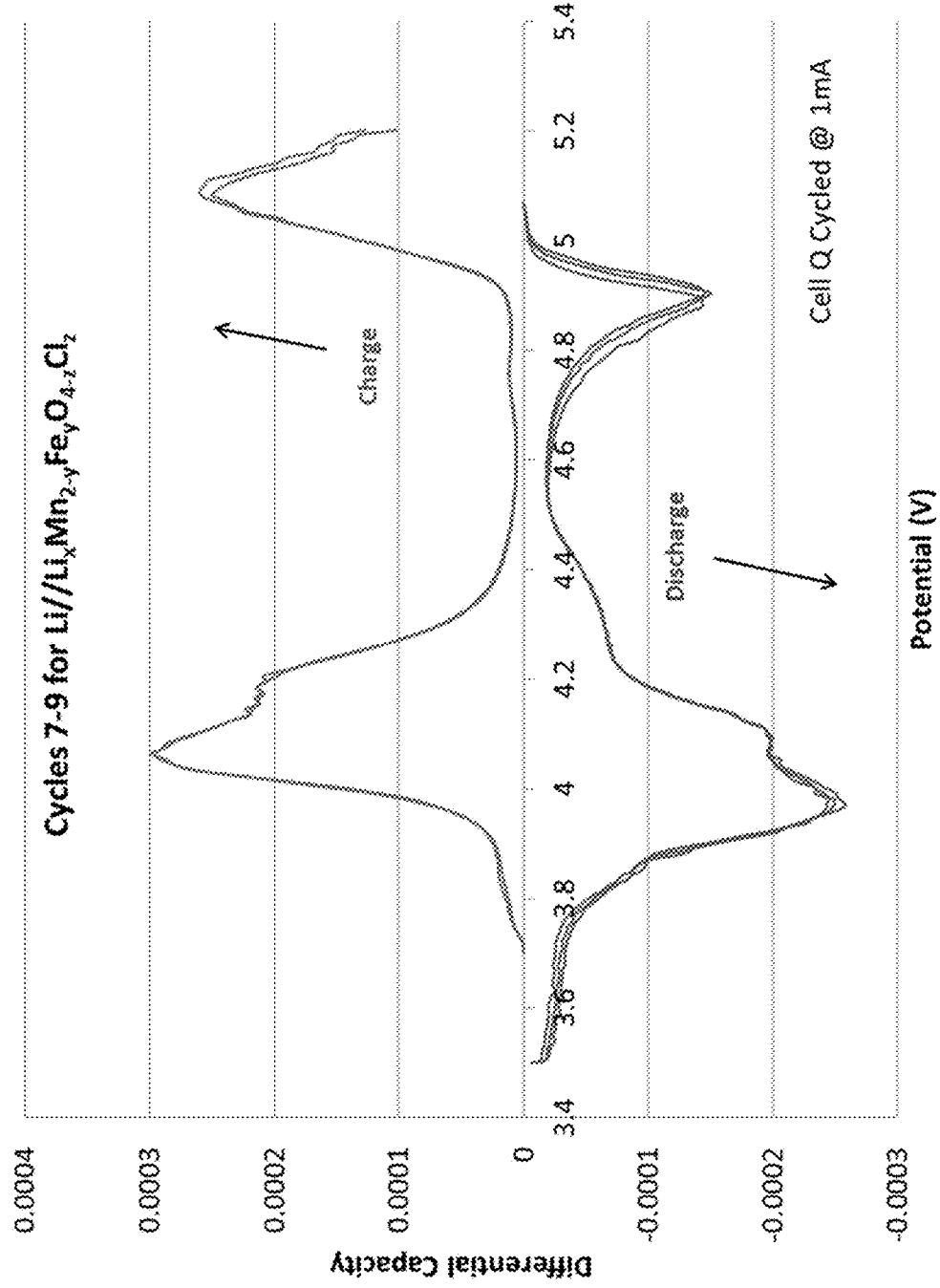
FIG. 32 is a differential capacity graph illustrating cycles 7 to 9 for a lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure cycled between 5.2 and 3.5 volts. For this graph, the M in $Li_xMn_{2-y}M_yO_{4-z}Cl_z$ is Fe.
Figure 33:
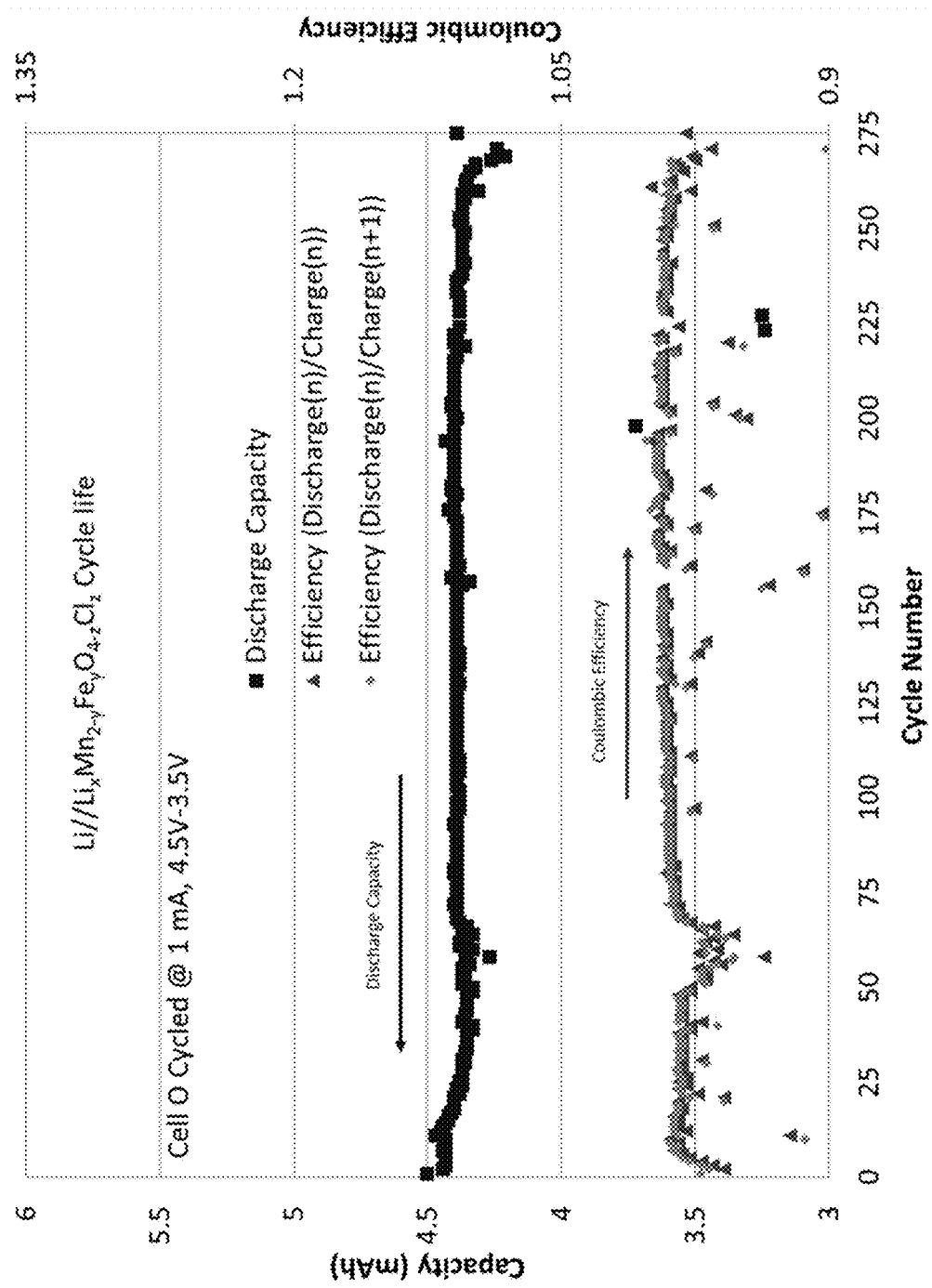
FIG. 33 is a graph illustrating representative coulombic efficiency and cycle life of an exemplary lithium cell containing a Group VIII Period 4 element (iron, cobalt, or nickel) "B" site and chlorine "O" site modified lithium manganese-based $AB_2O_4$ spinel cathode material according to an exemplary embodiment of the present disclosure cycled between 4.5 and 3.5 volts. For this graph, the M in $Li_xMn_{2-y}M_yO_{4-z}Cl_z$ is Fe.

FIGS. 31-33 show galvanostatic (charge/discharge), differential capacity plots and cycle life plot for lithium electrochemical cells fabricated with "B" and "O" site modified lithium manganese-based $AB_2O_4$ spinel cathode material, synthesized using the method described in the present disclosure. In the exemplary plots shown in FIGS. 31-33 iron is the Group VIII Period 4 "B" site element in the modified lithium manganese-based $AB_2O_4$ spinel cathode material. The chlorine to manganese ratios in the final product is 0.0117 while the iron to manganese ratio is 0.1195.

FIGS. 31 and 32 show exemplary cycle plots for lithium electrochemical cells fabricated with "B" and "O" site modified lithium manganese-based $AB_2O_4$ spinel cathode material, synthesized using the method described in the present disclosure where $Li_xMn_{1.79}Fe_{0.21}O_{3.979}Cl_{0.021}$ is the active cathode material and lithium is the active anode material. For this example the cell was charged to a potential of 5.2 volts and discharged to a potential of 3.5 volts. In FIG. 31 the cycle charge/discharge data is presented potential verses time and, in FIG. 32 the cycle charge/discharge data is presented as differential capacity.

FIG. 33 shows exemplary coulombic efficiency and cycle life plots for lithium electrochemical cells fabricated with "B" and "O" site modified lithium manganese-based $AB_2O_4$ spinel cathode material, synthesized using the method described in the present disclosure where $Li_xMn_{1.79}Fe_{0.21}O_{3.979}Cl_{0.021}$ is the active cathode material and lithium is the active anode material. For this example the cell was charged to a potential of 4.5 and discharged to a potential of 3.5.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A method of preparing a homogeneously dispersed Group VIII Period 4 element and chlorine-modified lithium manganese based $AB_2O_4$ spinel cathode material, the method comprising:
   dissolving a chloride of a Group VIII Period 4 element, a nitrate of a Group VIII Period 4 element, manganese nitrate, and lithium nitrate in distilled water or deionized water to produce an aqueous solution;
   mixing the aqueous solution with a chelating agent to produce a mixture;
   heating the mixture at a temperature ranging from 75° C. to 120° C. to produce a gel;
   heating the gel at a temperature ranging from 200° C. to 300° C. to produce an ash;
   grinding the ash; and
   calcining the ground ash for a time period no greater than 5 hours at a temperature of at least 350° C. to produce the homogeneously dispersed Group VIII Period 4 element and chlorine-modified lithium manganese-based $AB_2O_4$ spinel cathode material,
   wherein the Group VIII Period 4 element is selected from a group consisting of iron and cobalt, and
   wherein the homogeneously dispersed Group VIII Period 4 element and chlorine-modified lithium manganese-based $AB_2O_4$ spinel cathode material is fully reversible at charge potentials equal to or greater than 5.2 volts and discharge potentials equal to or less than 2.0 volts.

2. The method according to claim 1, wherein the chelating agent is a compound selected from a group consisting of glycine, cellulose, citric acid, a cellulose-citric acid mixture, and urea.

3. The method according to claim 1, further comprising mixing the homogeneously dispersed Group VIII Period 4 element and chlorine-modified lithium manganese-based $AB_2O_4$ spinel cathode material with a conductive carbon and a binder.

4. The method according to claim 3, wherein the conductive carbon is selected from a group consisting of conductive carbon black, graphite, carbon nanofibers, and carbon nanoparticles and the binder is selected from a group consisting of polytetrafluoroethylene, polyvinylidene fluoride, and latex.

* * * * *